(12) United States Patent
Shimomugi et al.

(10) Patent No.: US 9,225,258 B2
(45) Date of Patent: Dec. 29, 2015

(54) BACKFLOW PREVENTING MEANS, POWER CONVERTING DEVICE, AND REFRIGERATING AND AIR-CONDITIONING APPARATUS

(75) Inventors: Takuya Shimomugi, Tokyo (JP); Koichi Arisawa, Tokyo (JP); Yosuke Shinomoto, Tokyo (JP); Takashi Yamakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 11 days.

(21) Appl. No.: 13/981,978

(22) PCT Filed: Jan. 31, 2011

(86) PCT No.: PCT/JP2011/000507
§ 371 (c)(1),
(2), (4) Date: Jul. 26, 2013

(87) PCT Pub. No.: WO2012/104889
PCT Pub. Date: Aug. 9, 2012

(65) Prior Publication Data
US 2014/0204491 A1    Jul. 24, 2014

(51) Int. Cl.
*H02H 3/00* (2006.01)
*H02M 7/12* (2006.01)
(Continued)

(52) U.S. Cl.
CPC ....... *H02M 7/12* (2013.01); *H02M 7/06* (2013.01); *H02J 1/108* (2013.01); *H02J 7/0034* (2013.01); *H02M 1/32* (2013.01);
(Continued)

(58) Field of Classification Search
USPC .................................................. 361/86–87, 84
See application file for complete search history.

(56) References Cited

U.S. PATENT DOCUMENTS 6,075,345 A * 6/2000 Lee ............................... 320/138
6,462,965 B1 * 10/2002 Uesono ....................... 363/21.14
(Continued)

FOREIGN PATENT DOCUMENTS

CN      1574582 A    2/2005
CN    103125066 A    5/2013
(Continued)

OTHER PUBLICATIONS

International Search Report of the International Searching Authority mailed May 10, 2011 for the corresponding international application No. PCT/JP2011/000507 (with English translation).
(Continued)

*Primary Examiner* — Danny Nguyen
(74) *Attorney, Agent, or Firm* — Posz Law Group, PLC

(57) ABSTRACT

For example, backflow preventing means is provided, which reduces a recovery electric current occurring in the event of backflow of an electric current so as to ensure high efficiency, high reliability, etc. The backflow preventing means includes a backflow preventing element, such as a rectifying element, which is connected between an alternating-current power supply and a load and prevents the electric current from flowing backward from the load toward the alternating-current power supply; and commutating means for performing a commutation operation for causing the electric current to flow toward a different path that is connected in parallel with the backflow preventing element, whereby a conduction loss and a loss caused by the electric current can be reduced.

19 Claims, 31 Drawing Sheets

(51) Int. Cl.
  *H02M 7/06*   (2006.01)
  *H02J 1/10*   (2006.01)
  *H02J 7/00*   (2006.01)
  *H02P 25/08*  (2006.01)
  *H02M 1/32*   (2007.01)
  *H02M 1/00*   (2007.01)

(52) U.S. Cl.
  CPC ..... *H02M 2001/0051* (2013.01); *H02P 25/082* (2013.01); *Y02B 70/1491* (2013.01)

(56) References Cited

U.S. PATENT DOCUMENTS

| | | | |
|---|---|---|---|
| 6,987,675 B2* | 1/2006 | Jovanovic et al. | 363/21.01 |
| 2002/0097029 A1 | 7/2002 | Mantov | |
| 2004/0057189 A1* | 3/2004 | Cheever et al. | 361/160 |
| 2005/0226012 A1 | 10/2005 | Jovanovic et al. | |
| 2010/0253312 A1* | 10/2010 | Morimoto | 323/312 |
| 2013/0152624 A1 | 6/2013 | Arisawa et al. | |

FOREIGN PATENT DOCUMENTS

| | | | |
|---|---|---|---|
| JP | 56-133289 U | 10/1981 | |
| JP | 08-266057 A | 10/1996 | |
| JP | 2002-369535 A | 12/2002 | |
| JP | 2005-160284 A | 6/2005 | |
| JP | 2006-006061 A | 1/2006 | |
| JP | 2006-067696 A | 3/2006 | |
| JP | 2007-252055 A | 9/2007 | |
| JP | 2008-061403 A | 3/2008 | |
| JP | 2008-086053 A | 4/2008 | |
| JP | 2010-200401 A | 9/2010 | |

OTHER PUBLICATIONS

Office Action mailed Jul. 8, 2014 issued in corresponding JP patent application No. 2012-555547 (and English translation).
Office Action dated Oct. 1, 2014 issued in corresponding AU patent application No. 2011358036.
Office Action dated Jun. 10, 2014 issued in corresponding KR patent application No. 10-2013-7019711 (and English translation).
Office Action dated Dec. 29, 2014 issued in corresponding KR patent application No. 10-2013-7019711 (and English translation).
Office Action issued Feb. 19, 2015 in the corresponding AU patent application No. 2011358036.
Office Action dated Feb. 16, 2015 issued in corresponding CN patent application No. 201180066472.1 (and English translation).
Office Action mailed Mar. 17, 2015 issued in corresponding JP patent application No. 2012-555547 (and English translation).
Office Action mailed Jun. 17, 2015 in the corresponding Korean Patent Application No. 10-2013-7019711 (English translation attached).

* cited by examiner

F I G. 1
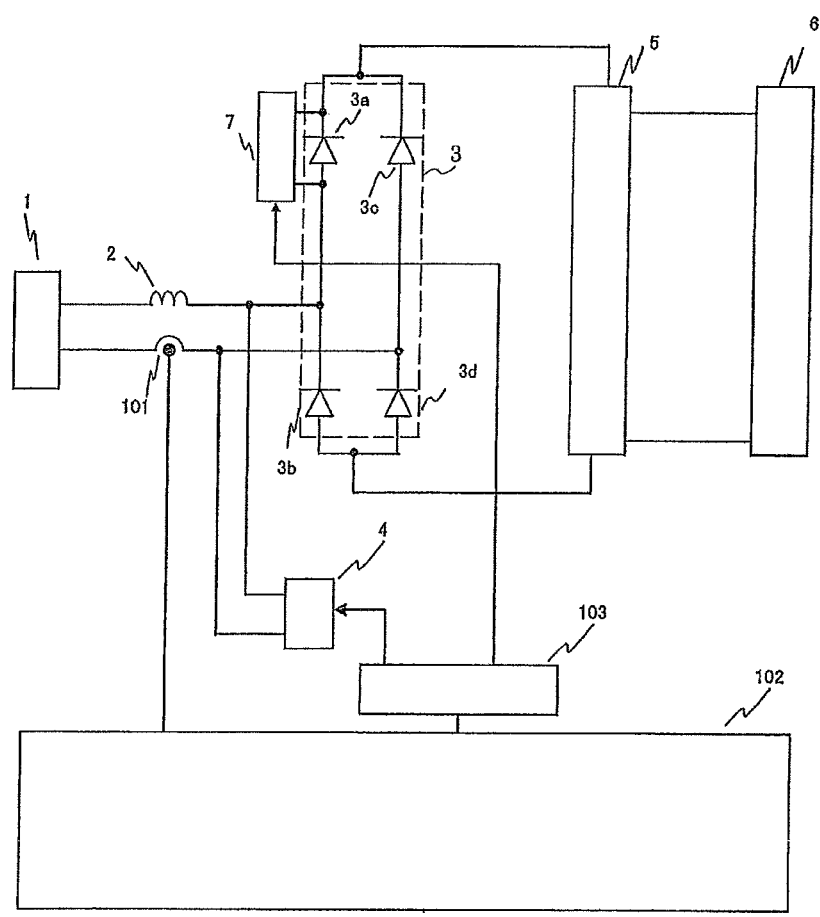

F I G. 2
(a)
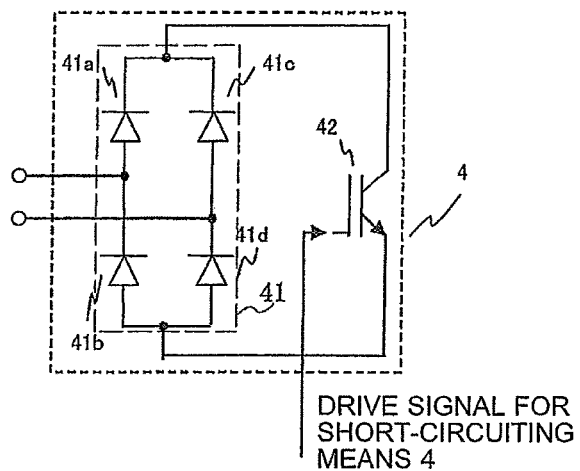
DRIVE SIGNAL FOR
SHORT-CIRCUITING
MEANS 4
(b)
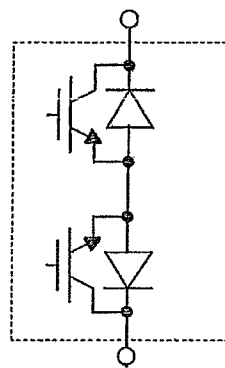

DRIVE SIGNAL FOR
COMMUTATING MEANS 7

FIG. 5
(a)
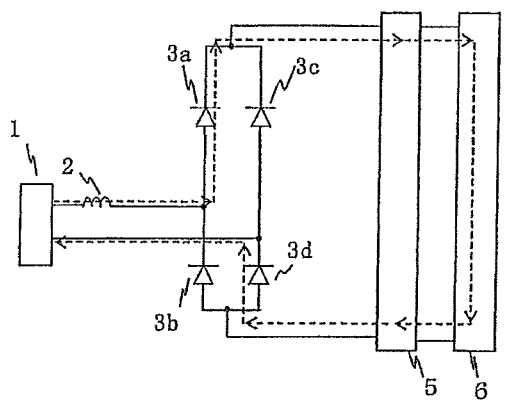
(b)
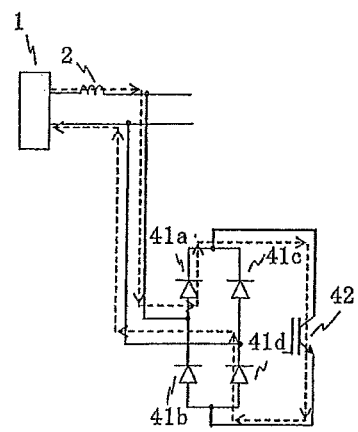
(c)
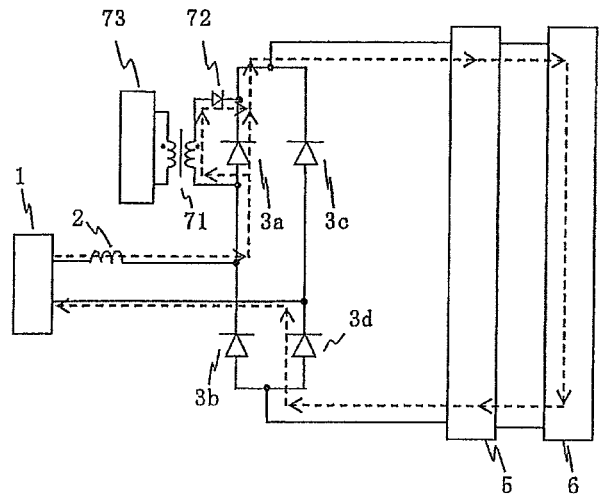

FIG. 8
DRIVE SIGNAL FOR SHORT-CIRCUITING MEANS 4 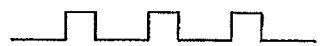
DRIVE SIGNAL FOR COMMUTATING MEANS 7 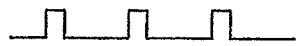
POWER-SUPPLY CURRENT 
ELECTRIC CURRENT FLOWING THROUGH SWITCH 42 
ELECTRIC CURRENT FLOWING THROUGH RECTIFYING ELEMENT 72 
ELECTRIC CURRENT FLOWING THROUGH RECTIFYING ELEMENT 3a 
COMBINED ELECTRIC CURRENT FLOWING THROUGH RECTIFYING ELEMENTS 3a AND 72 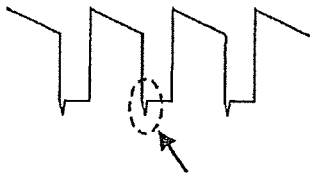
RECOVERY ELECTRIC CURRENT: LOW FIG. 13
(a) 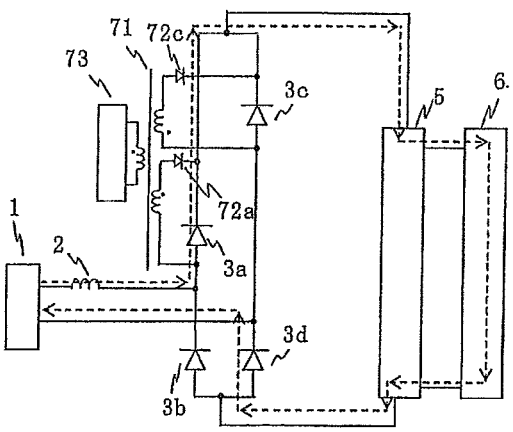
(b) 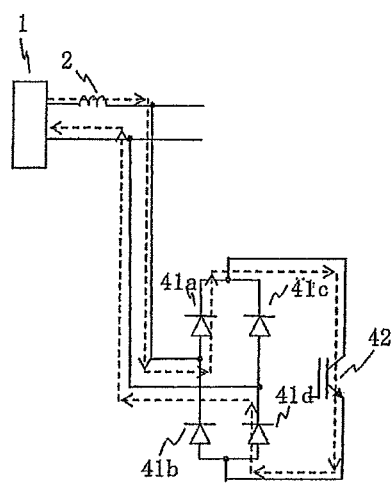
(c) 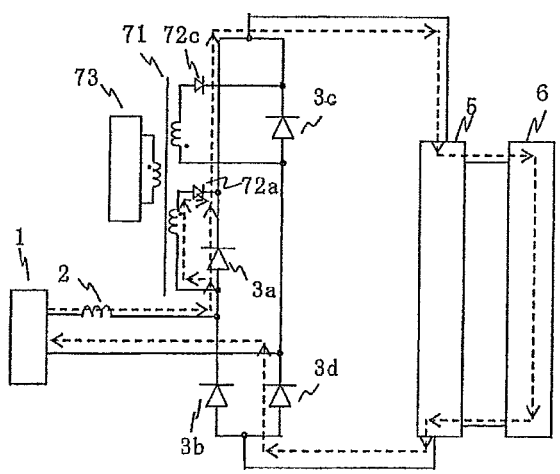

F I G. 1 6
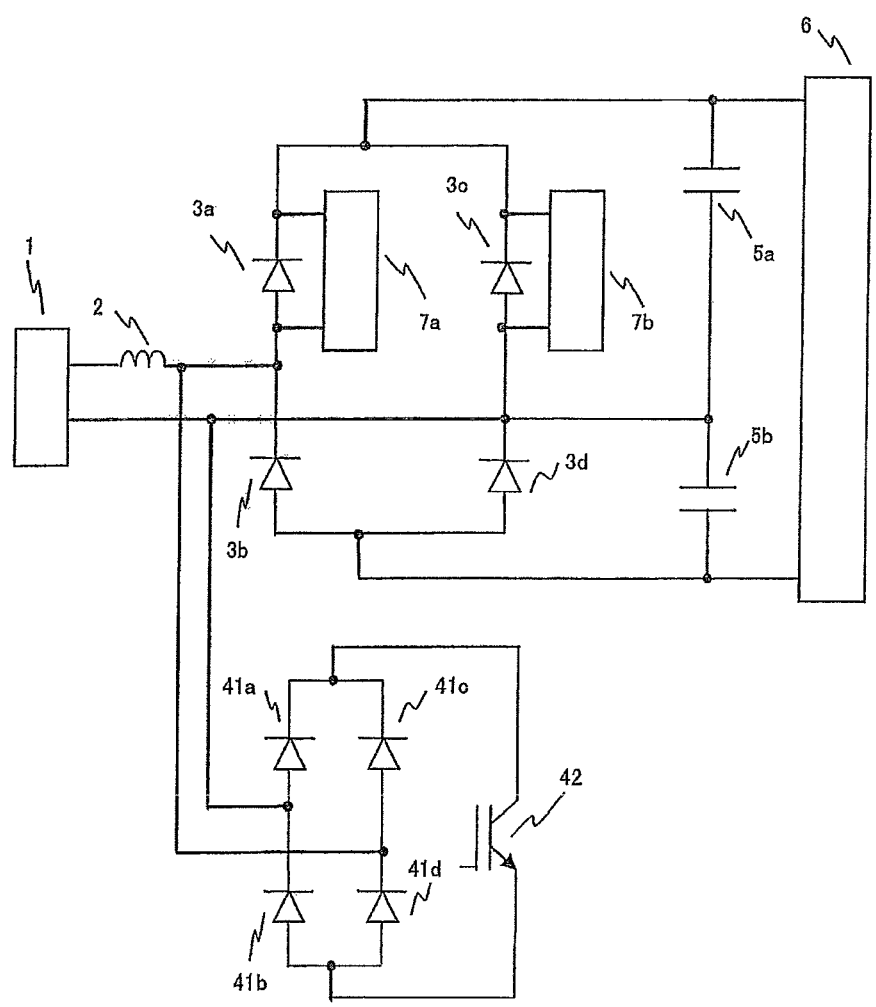

FIG. 17
(a)
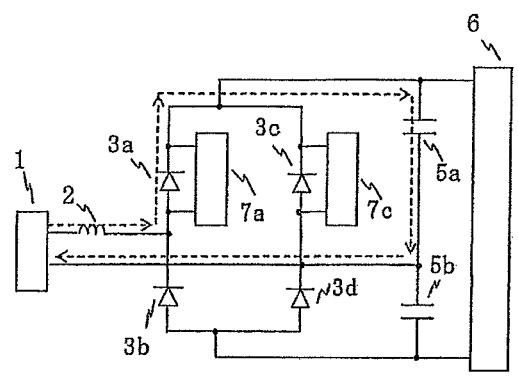
(b)
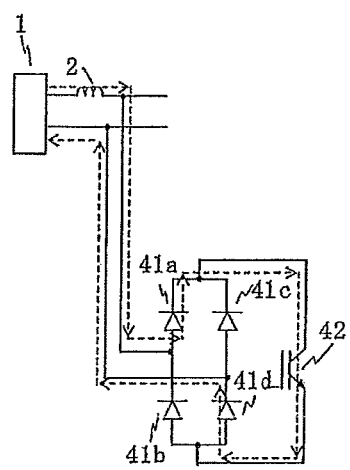
(c)
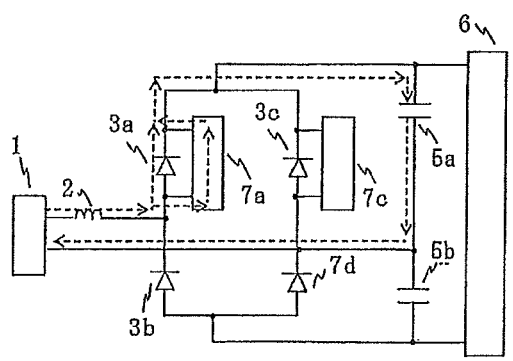

FIG. 19
(a)
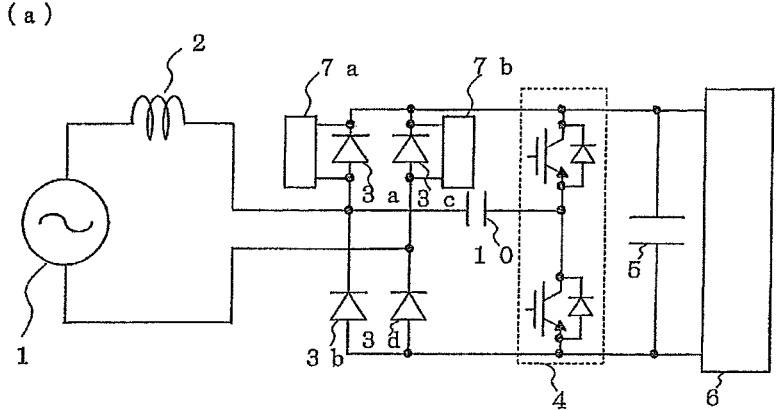
(b)
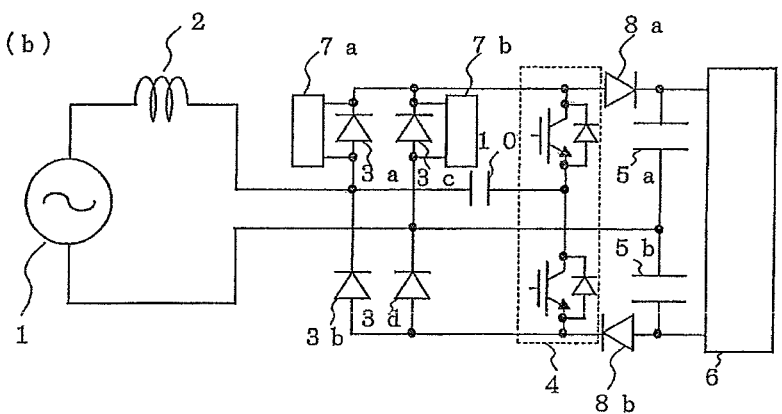

FIG. 26
(a)
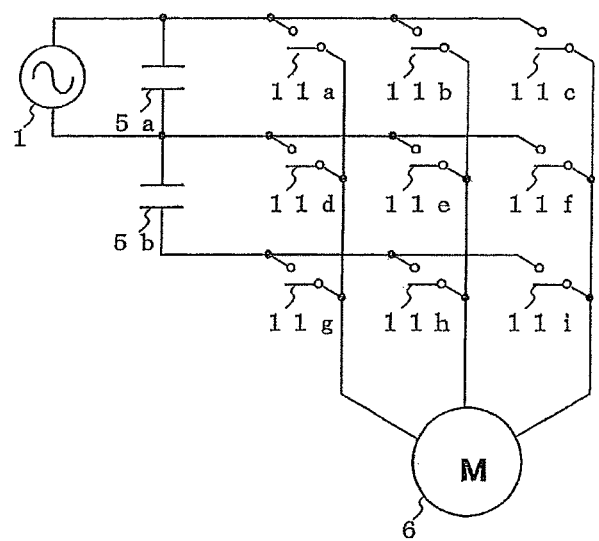
(b)
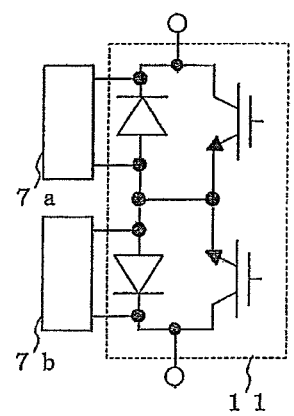

FIG. 35
(a)
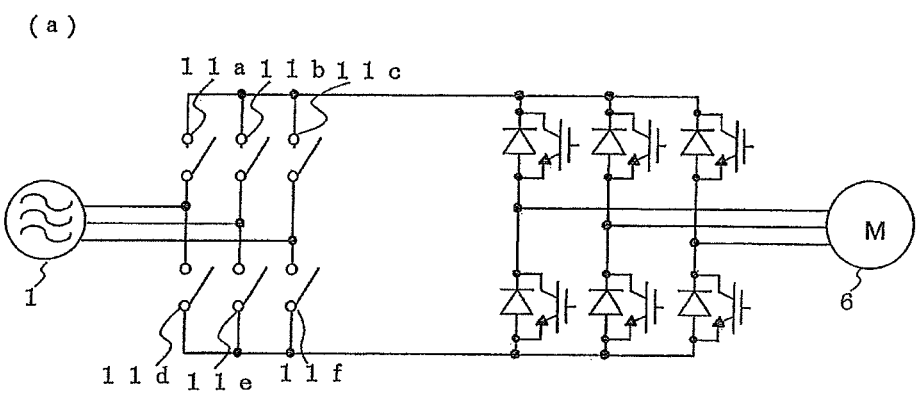
(b)
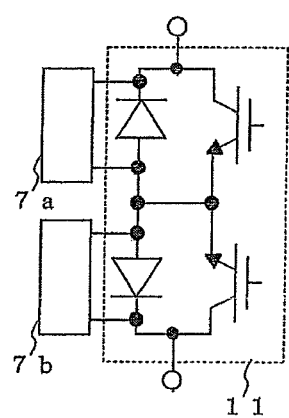

BACKFLOW PREVENTING MEANS, POWER CONVERTING DEVICE, AND REFRIGERATING AND AIR-CONDITIONING APPARATUS

CROSS REFERENCE TO RELATED APPLICATIONS

This application is a U.S. national stage application of PCT/JP2011/000507 filed on Jan. 31, 2011, the disclosure of which is incorporated herein by reference.

TECHNICAL FIELD

The present invention relates to, for example, backflow preventing means included in, for example, power converting devices.

BACKGROUND

Application fields of various kinds of power converting devices have been studied in accordance with practical application of, for example, variable-voltage variable-frequency inverters.

For example, with regard to power converting devices, the applied technology of buck-boost converters has been actively developed in recent years. On the other hand, for example, wide band-gap semiconductors composed of, for example, silicon carbide have also been actively developed. With regard to such new elements, elements that have high voltage resistant characteristics but have small current-carrying capacity (i.e., a low permissible effective electric-current value) are put to practical use mainly as rectifiers (for example, see Patent Literature 1).

PATENT LITERATURE

Patent Literature 1: Japanese Unexamined Patent Application Publication No. 2005-160284 (FIG. 1)

On the other hand, with regard to practical application of new highly-efficient elements, there are many problems for putting, for example, elements with large electric-current capacity to practical use in terms of, for example, high costs and crystal defects. Thus, it is conceivable that it may take time for such elements to become popular. Therefore, at the present time, it is difficult to achieve increased efficiency by using the new elements in, for example, apparatuses that handle electric power that is higher than or equal to electric power to be supplied to, for example, motors for compressors in air-conditioning apparatuses. For this reason, for example, in a backflow preventing element for stopping the flow of electric current flowing backward from a load toward a power supply, it is difficult to reduce a loss caused by a recovery electric current occurring when the electric current flows backward.

SUMMARY

In view of the problems described above, an object of the present invention is to provide, for example, backflow preventing means and a power converting device that reduce the recovery electric current occurring in the event of backflow of electric current so as to ensure high efficiency, high reliability, etc.

Solution to Problem

Backflow preventing means according to the present invention includes a backflow preventing element that is connected between a power supply and a load and that prevents electric current from flowing backward from the load toward the power supply, and commutating means for performing a commutation operation for causing electric current to flow toward a different path that is connected in parallel with the backflow preventing element.

According to the present invention, the commutating means that can perform the commutation operation is provided so that the electric current flowing through the backflow preventing element can be commutated to the different path. Therefore, for example, if the electric current flows backward from the load side during the operation of the power converting device, a recovery electric current generated in the backflow preventing element can be reduced, whereby a conduction loss and a loss caused by such electric current can be reduced regardless of, for example, the current-carrying capacity of the backflow preventing element. Since a loss can be reduced by the commutation operation of the commutating means, increased efficiency can be achieved in the overall system.

By reducing the recovery electric current flowing from the load side toward the power supply, the level of noise terminal voltage caused by electric-current generation can be reduced. This is effective for coping with EMC (electro-magnetic compatibility). In particular, a noise filter can be reduced in size, and cost reduction can be achieved.

Furthermore, a possibility of the occurrence of, for example, arm short-circuit in a switching element used in the system is eliminated, thereby allowing for highly-reliable design.

Moreover, since commutation can be realized by the simple commutation operation of the commutating means, a signal for driving the commutating means can be generated by a relatively simple method. Therefore, for example, a relatively inexpensive controller, such as a microcomputer, can be used, thereby suppressing an increase in cost.

BRIEF DESCRIPTION OF DRAWINGS

FIG. 1 illustrates a configuration example of a power converting device according to Embodiment 1 of the present invention.

FIG. 2 illustrates a configuration example of short-circuiting means 4 according to Embodiment 1.

FIG. 5 illustrates examples of electric-current paths according to Embodiment 1.

FIG. 8 illustrates an example of operation waveforms when the commutation control according to Embodiment 1 is performed.

FIG. 13 illustrates examples of electric-current paths according to Embodiment 2.

FIG. 16 illustrates a configuration example of a power converting device according to Embodiment 3 of the present invention.

FIG. 17 illustrates examples of electric-current paths according to Embodiment 3.

FIG. 19 illustrates other configuration examples of the power converting device according to Embodiment 3.

FIG. 26 illustrates another configuration example of the power converting device according to Embodiment 6.

FIG. 35 illustrates another configuration example of the power converting device according to Embodiment 7.

DESCRIPTION OF EMBODIMENTS

Figure 3:
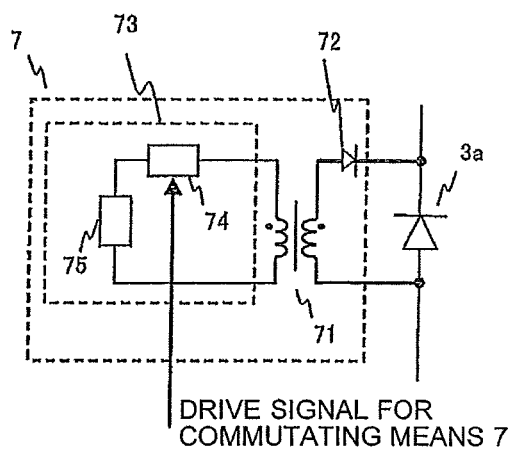
FIG. 3 illustrates a configuration example of commutating means 7 according to Embodiment 1.

For example, power converting devices having backflow preventing means according to Embodiments of the present invention will be described below with reference to the drawings, etc.

Embodiment 1

FIG. 1 illustrates an example of a configuration centered on a power converting device according to Embodiment 1 of the present invention. First, a system configuration having the power converting device in FIG. 1 that can perform power conversion with high efficiency will be described.

In the system in FIG. 1, the power converting device is provided between an alternating-current power supply 1 and a load 6. The power converting device converts alternating-current power from the alternating-current power supply 1 into direct-current power and supplies the direct-current power to the load 6. The power converting device according to Embodiment 1 has, for example, a reactor 2, a rectifying circuit 3, short-circuiting means (i.e., switching means) 4, smoothing means 5, and commutating means 7.

The reactor 2 is provided for suppressing harmonics. The rectifying circuit (i.e., rectifying means) 3 is constituted of bridge-connected rectifying elements 3a to 3d, such as diodes, and rectifies the electric power from the alternating-current power supply 1. The rectifying element 3a that is at least connected in parallel with the commutating means 7 also functions as backflow preventing means that prevents backflow of electric current (i.e., an electric current flowing in the reverse direction from the smoothing means 5). The smoothing means 5 is constituted of, for example, a capacitor. The smoothing means 5 is configured to smooth voltage involved in the rectification in the rectifying elements 3a to 3d and apply direct-current voltage (i.e., output voltage) to the load 6 so as to supply electric power thereto.

FIG. 2 illustrates a configuration example of the short-circuiting means 4. For example, in FIG. 2(a), a short-circuiting rectifying circuit 41 having bridge-connected rectifying elements 41a to 41d and a short-circuiting switch 42 constitute the short-circuiting means 4. The short-circuiting means 4 short-circuits the alternating-current power supply 1 (i.e., between two terminals connected to the alternating-current power supply 1) via the reactor 2. In the case where the alternating-current power supply 1 is to be short-circuited as in Embodiment 1, the direction in which an electric current flows through the short-circuiting means 4 at the time of the short-circuit varies depending on the phase. FIG. 2 shows a general configuration in which a single element that does not allow the electric current to flow bidirectionally therethrough, such as an IGBT, is used as the short-circuiting switch 42. Alternatively, as shown in FIG. 2(b), the short-circuiting means 4 may be constituted of, for example, a bidirectional switch formed by using a plurality of IGBTs (insulated gate bipolar transistors), MOS-FETs (field-effect transistors), etc. In that case, a similar effect can be achieved.

FIG. 3 illustrates a configuration example of the commutating means 7. The commutating means 7 is configured to commutate an electric current flowing toward the rectifying element 3a (i.e., an electric current flowing in the forward direction) to a different path (i.e., a path that is not intervened by the rectifying element 3a) at a required timing. In FIG. 3, for example, a transformer 71, a commutation rectifying element 72, such as a diode that is connected in series with a secondary winding of the transformer 71, and a transformer driving circuit 73 that drives the transformer 71 constitute the commutating means 7. The transformer driving circuit 73 includes, for example, a commutation power supply 75 for supplying electric power to the transformer 71, and a commutation switch 74 that opens and closes based on a drive signal from a drive-signal generating unit 103 so as to control the electric power supply and the stoppage of the electric power supply to the transformer 71 (i.e., a primary winding).

Although the characteristics of the commutation rectifying element 72 will be described later, the commutation rectifying element 72 is, for example, a semiconductor element having excellent electrical characteristics (i.e., recovery characteristics in particular), small current-carrying capacity, and a fast reverse recovery time. Because the commutation rectifying element 72 is disposed on a path through which electric power is supplied from the alternating-current power supply 1 toward the load 6, the commutation rectifying element 72 is desirably a high-voltage-resistant element.

Although FIG. 3 shows an example in which the secondary winding of the transformer 71 and an anode side of the commutation rectifying element 72 are connected to each other, the connection is not limited to the above so long as the direction in which the electric current flows through the commutation rectifying element 72 is the same. For example, a cathode side of the commutation rectifying element 72 and the secondary winding of the transformer 71 may be connected to each other. Furthermore, although the transformer driving circuit 73 is constituted of the commutation switch 74 and the commutation power supply 75, the transformer driving circuit 73 may alternatively be formed by inserting, for example, a limiting resistor, a high-frequency capacitor, a snubber circuit, or a protection circuit into an electric circuit constituted of the commutation power supply 75, the commutation switch 74, and the primary winding of the transformer 71, where necessary, in view of noise reduction and protection in the event of a failure. Furthermore, where necessary, a reset winding may be added to the primary winding of the transformer 71 so that an excitation current can be reset. Moreover, by providing, for example, a rectifier, excitation energy may be regenerated at the power supply side so that increased efficiency can be achieved.

An input electric-current detector 101 detects an input electric current flowing from the alternating-current power supply 1 and outputs a detection signal. Control means 102 includes, for example, an arithmetic unit, such as a microcomputer or a digital signal processor, or a unit having a similar function therein. The control means 102 calculates, for example, a short-circuiting time of the short-circuiting means 4 from the detection signal from the input electric-current detector 101 and outputs a signal. The drive-signal generating unit 103 generates drive signals for the short-circuiting means 4 and the commutating means 7 on the basis of the output signal (i.e., an on-duty signal) from the control means 102 and transmits the drive signals to the short-circuiting means 4 and the commutating means 7.

Figure 4:
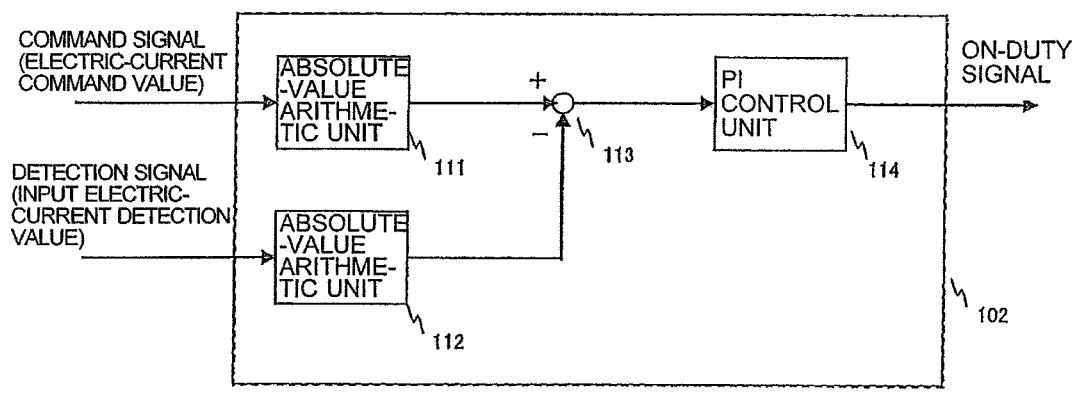
FIG. 4 illustrates a configuration example of control means 102 according to Embodiment 1.

FIG. 4 illustrates a configuration example of the control means 102 according to Embodiment 1. As shown in FIG. 4, the control means 102 has absolute-value arithmetic units 111 and 112, a subtracting unit 113, and a PI control unit 114. The absolute-value arithmetic unit 111 calculates an absolute value of an electric-current command value on the basis of, for example, a command signal input from the outside (e.g. control means included in a device serving as the load 6). The absolute-value arithmetic unit 112 calculates an absolute value of an input electric-current detection value on the basis of the detection signal from the input electric-current detector 101. The subtracting unit 113 calculates a deviation (i.e., a difference) between the absolute value of the electric-current command value and the absolute value of the input electric-current detection value. The PI control unit 114 performs proportional-integral control and transmits an output signal to the drive-signal generating unit 103.

Although the control means 102 performs proportional-integral control (i.e., feedback control) on the basis of the difference between the absolute value of the electric-current command value and the absolute value of the input electric-current detection value in Embodiment 1, the control method is not limited to the above. For example, derivative control may be included. Furthermore, the control may be performed on the basis of, for example, voltage, in addition to electric currents.

The following description relates to an operation related to Embodiment 1 described above. In the operation performed in the power converting device according to Embodiment 1, a commutation operation in the rectifying circuit 3 and the commutating means 7 is added to an operation of an AC chopper so that the rectifying element 3a is reverse-recovered before the electric current flows backward from the smoothing means 5, whereby the occurrence of a recovery electric current is suppressed.

FIG. 5 illustrates examples of electric-current paths according to Embodiment 1. Of various combinations of open and closed states of the short-circuiting switch 42 within the short-circuiting means 4 and the commutation switch 74 within the commutating means 7, FIG. 5 shows paths according to representative operation examples.

Figure 6:
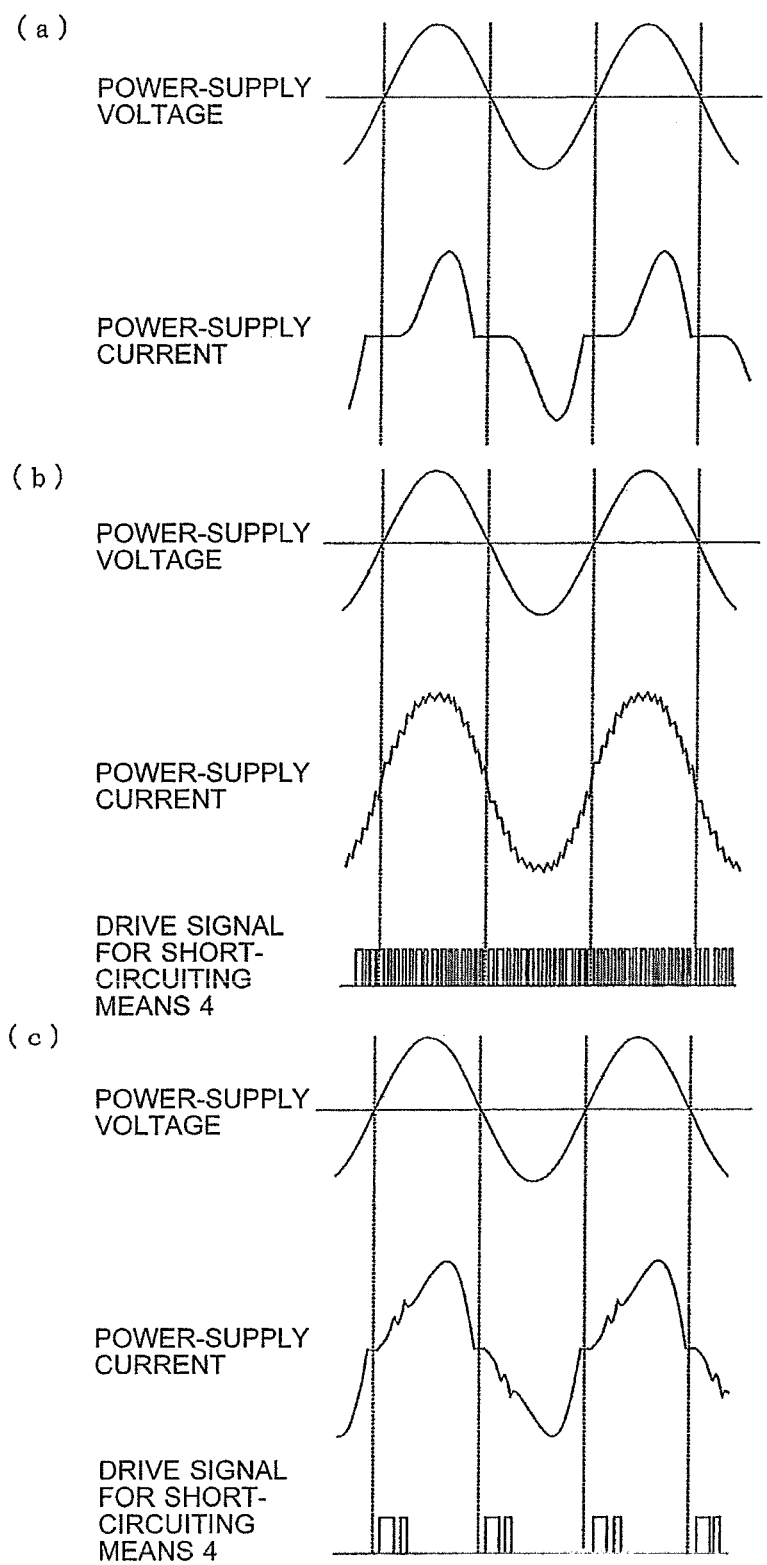
FIG. 6 illustrates examples of operation waveforms according to Embodiment 1.

FIG. 6 illustrates waveforms (i.e., operation waveforms) related to the behavior of power-supply voltage, power-supply currents (i.e., input electric current), and a drive signal transmitted to the short-circuiting means 4 in accordance with the operation based on FIG. 5. The operation of the power converting device according to Embodiment 1 will now be described with reference to FIGS. 5 and 6.

FIG. 5(a) illustrates an electric-current path when the short-circuiting switch 42 and the commutation switch 74 are set in an off-state (i.e., open state). When electric power is supplied from the alternating-current power supply 1 while the short-circuiting switch 42 and the commutation switch 74 are set in the off-state, simple full-wave rectification is achieved. For example, of the terminals of the alternating-current power supply 1, if the terminal connected to the reactor 2 has the higher electric potential, the electric-current path is formed by the alternating-current power supply 1, the reactor 2, the rectifying element 3a, the load 6, and the rectifying element 3d. For example, an operation waveform when the short-circuiting switch 42 and the commutation switch 74 are set in the off-state corresponds to FIG. 6(a). In the case of the input electric current from the alternating-current power supply 1 as in FIG. 6(a), the power factor is poor, and the input electric current contains a large amount of harmonic current.

FIG. 5(b) illustrates a state where the short-circuiting switch 42 is in an on-state (i.e., closed state). The commutation switch 74 is set in an off-state. In this case, a short-circuit current flows through a path formed by the alternating-current power supply 1, the reactor 2, the rectifying element 41a, the short-circuiting switch 42, and the rectifying element 41d. The voltage applied to the reactor 2 is substantially equal to the voltage of the alternating-current power supply 1, and the short-circuit current flowing through the path shown in FIG. 5(b) is expressed by the following expression (1):

$$i\_sw42on = (Vs/L) \cdot t + i(0) \qquad (1)$$

In this case, i_sw42 on denotes an electric current value when the short-circuiting switch 42 is switched on, Vs denotes a voltage value of the alternating-current power supply 1, L denotes an impedance value of the reactor 2, t denotes an on-state time of the short-circuiting switch 42, and i(0) denotes an electric current value (i.e., an initial value) immediately before the short-circuiting switch 42 is switched on.

Normally, in full-wave rectification, the input electric current from the alternating-current power supply 1 is non-conductible through a section where the electric current discharged from the smoothing means 5 flows through the load 6. However, when the short-circuiting switch 42 is set in an on-state, since the short-circuit current flows via the reactor 2, as shown in FIG. 5(b), the input electric current from the alternating-current power supply 1 flows even through the aforementioned non-conductible section. Therefore, by repeatedly switching the short-circuiting switch 42 between an on-state and an off-state, the electric-current paths shown in FIGS. 5(a) and 5(b) can be repeatedly alternated. Furthermore, by controlling the time ratio between the on-state and the off-state, the waveform of the input electric current from the alternating-current power supply 1 can be transformed into an arbitrary waveform, whereby the power factor and the harmonic-current content can be improved.

For example, in the case where the control means 102 has the configuration as in FIG. 4, the absolute-value arithmetic unit 111 calculates an absolute value of an electric-current command value on the basis of, for example, a command signal input from the outside. Moreover, the absolute-value arithmetic unit 112 calculates an absolute value of an input electric-current detection value on the basis of a detection signal from the input electric-current detector 101. The subtracting unit 113 calculates a deviation between the absolute values of the electric-current command value and the input electric-current detection value. By performing proportional-integral control, the PI control unit 114 calculates an on-duty time (i.e., an on-state time) of the short-circuiting switch 42 such that the input electric-current detection value becomes closer to the electric-current command value, and outputs an on-duty signal.

Furthermore, the drive-signal generating unit 103 generates a drive signal for the short-circuiting switch 42 on the basis of, for example, a comparison between a triangular-wave signal having a frequency that is equal to a switching frequency of the short-circuiting switch 42 and the on-duty signal calculated by the PI control unit 114. Generally, when such control is performed, the switching frequency of the short-circuiting switch 42 is about several kHz to several tens of kHz.

By forming the command signal containing the aforementioned electric-current command value into, for example, a sine wave having a desired amplitude and having a frequency and a phase that are identical to those of the voltage of the alternating-current power supply 1, the input electric current from the alternating-current power supply 1 can be controlled in the form of a sine wave, whereby the power factor and the harmonic-current content can be significantly improved (FIG. 6(b)).

Although the above-described example relates to input electric-current control performed by detecting the input electric current, the control method is not limited to the above. For example, output voltage control may be performed by detecting the voltage (i.e., output voltage) that is smoothed by the smoothing means 5 and is to be applied to the load 6 and then performing proportional-integral control or the like on the difference between the detected voltage and a desired voltage command value input from, for example, the outside. Moreover, the short-circuiting switch 42 may be controlled by detecting both the input electric current and the output voltage and generating a drive signal for the short-circuiting switch 42 on the basis of the detected input electric current and the detected output voltage.

In the above-described example, the short-circuiting switch 42 is controlled by being switched at high speed and the input electric current is controlled in the form of a sine wave. However, the control method is not limited to the above. For example, if the demands for suppressing the power factor and the harmonic-current content are not high, it is not necessarily required to perform control for making the input electric current into a sine wave. For example, as shown in FIG. 6(c), the power factor and the harmonic-current content can be improved by performing control such that the short-circuiting switch 42 is switched on only several times at an appropriate phase and for an appropriate on-state time in the non-conductible section of the input electric current.

For example, by comparing a harmonic regulation value with an analytic value of harmonic current contained in the input electric current and determining the phase at which the short-circuiting switch 42 is switched on and the on-state time thereof within a range that satisfies the regulation value, the number of times the short-circuiting switch 42 is switched can be minimized. As compared with the case where the short-circuiting switch 42 is switched at a frequency of several kHz to several tens of kHz described above, the number of times the short-circuiting switch 42 is switched can be significantly reduced, thereby allowing for reduction of a switching loss and reduction of generated noise. Furthermore, since an inexpensive low-speed element can be used as the short-circuiting switch 42, cost reduction can also be achieved.

When such control is to be performed, for example, input voltage of the alternating-current power supply 1 may be detected, and the phase at which the short-circuiting switch 42 is switched on and the on-state time thereof may be determined from, for example, zero-crossing of the input voltage. Furthermore, for example, output voltage control may be performed by detecting the output voltage of the smoothing means 5 and then performing proportional-integral control or the like on the difference between the output voltage and a desired voltage command value. Moreover, the short-circuiting switch 42 may be controlled by detecting both the input electric current and the output voltage.

Figure 7:
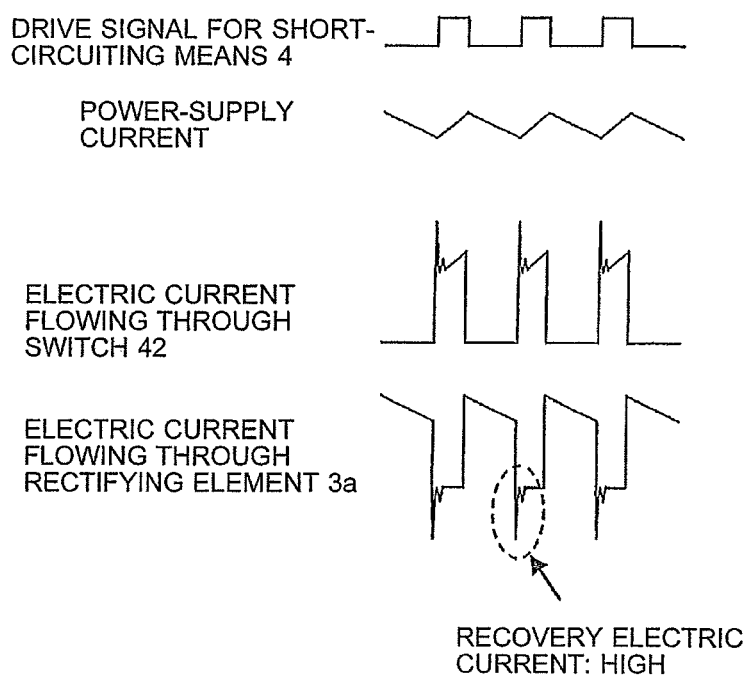
FIG. 7 illustrates an example of operation waveforms when commutation control according to Embodiment 1 is not performed.

FIG. 7 illustrates a signal and electric-current waveforms in a case where the commutating means 7 is not actuated. FIG. 7 shows a case where the short-circuiting switch 42 is continuously and repeatedly switched between an on-state and an off-state and one of the terminals, which is connected to the reactor 2, of the alternating-current power supply 1 has the higher electric potential, as in FIG. 5. With regard to a drive signal for the short-circuiting means 4 (i.e., the short-circuiting switch 42), the high side thereof is set as an active direction (i.e., on-state direction).

As described above, when the short-circuiting switch 42 is switched off, a forward electric current flows through the rectifying element 3a. When the short-circuiting switch 42 is switched on in this state, direct-current voltage that has been smoothed by the smoothing means 5 is applied to opposite ends of the series-connected rectifying elements 3a and 3b. In this case, reverse bias voltage that is half the direct-current voltage is applied to the rectifying element 3a. Subsequently, the rectifying element 3a changes over to an off operation.

During the period in which the rectifying element 3a changes over to an off operation, a short-circuit current flows in a direction opposite to that during the period in which the rectifying element 3a is switched on. The reason for this is as follows. In a state where forward bias voltage is steadily applied to p-n junction diodes used as the rectifying elements 3a to 3d, carriers are normally accumulated in semiconductors of both the p-type and n-type. When reverse bias voltage is instantaneously applied in this state, the carriers move in a direction opposite to the moving direction thereof when the forward bias voltage is applied (the short-circuit current flowing in the reverse direction in this case will be referred to as "recovery electric current" hereinafter). The recovery electric current causes a common-mode electric current to become displaced, causing the levels of noise terminal voltage, radiation noise, etc. to increase. This leads to an increase in cost required for noise reduction. In addition, this also leads to an increase in circuit loss.

Normally, when the current-carrying capacity of the rectifying diodes increases, the number of accumulated carriers also tends to increase. Therefore, the recovery electric current increases with increasing current-carrying capacity. Furthermore, the recovery electric current increases as the applied reverse bias voltage increases.

In Embodiment 1, control (referred to as "commutation control" hereinafter) is performed by forming a commutation path with the commutating means 7 and performing reverse recovery by applying low reverse bias voltage to the rectifying element 3a, having the large current-carrying capacity, via the transformer 71 and the commutation rectifying element 72 immediately before the short-circuiting switch 42 is switched on, instead of performing reverse recovery by applying high reverse bias voltage to the rectifying element 3a.

In commutation control, the commutation switch 74 of the commutating means 7 is switched on immediately before the short-circuiting switch 42 is switched on, and the electric current flowing toward the rectifying element 3a via the transformer 71 is commutated to the commutation rectifying element 72 side. FIG. 5(*c*) illustrates a state where the short-circuiting switch 42 is switched off and the commutation switch 74 is switched on. Similarly to FIG. 5(*a*), an electric-current path in this case is formed by the alternating-current power supply 1, the reactor 2, the rectifying element 3a, the load 6, and the rectifying element 3d. Additionally, since the commutation switch 74 is switched on, the transformer 71 is excited, so that the electric current also flows into a path formed by the secondary side of the transformer 71 and the commutation rectifying element 72 in the commutating means 7. When a certain period of time has elapsed, the electric current is completely commutated to the path at the commutation rectifying element 72 side.

FIG. 8 illustrates signals and electric-current waveforms in a case where the commutating means 7 is actuated. With regard to drive signals for the short-circuiting means 4 (i.e., the short-circuiting switch 42) and the commutating means 7 (i.e., the commutation switch 74), the high side thereof is set as an active direction (i.e., on-state direction). As shown in FIG. 8, the drive signal for the commutating means 7 is set to an on-state immediately before the drive signal for the short-circuiting switch 42 is set to an on-state. In this case, as described above, the electric current starts to flow toward the secondary-side path of the transformer 71 due to the excitation current. Thus, the electric current flows distributively toward the rectifying element 3a and the commutation rectifying element 27 in the respective directions thereof. Subsequently, as the drive signal for the commutating means 7 is maintained in the on-state, the electric current no longer flows toward the rectifying element 3a, so that the entire electric current flows toward the commutation rectifying element 72 (i.e., the commutation is completed).

When performing the commutation operation, the voltage applied by the commutation power supply 75 within the transformer driving circuit 73 is set to a sufficiently low value, as compared with the output voltage of the smoothing means 5, so that the rectifying element 3a can be switched off (i.e., reverse-recovered) with low reverse bias voltage. When the short-circuiting switch 42 is switched on in this state, a reverse recovery operation of the commutation rectifying element 72 is performed. In this case, a recovery electric current is generated. However, since the electric-current flowing time in the commutation rectifying element 72 is extremely short, as compared with that in the rectifying element 3a, the effective electric current of the electric current flowing through the commutation rectifying element 72 is low, meaning that the current-carrying capacity required therein may be small. Thus, a small-capacity element with a small number of accumulated carriers can be used, thereby allowing for reduction in the recovery electric current, as compared with a case where the recovery electric current is generated by the rectifying element 3a (in this case, the element is selected in view of the peak electric current). As a result, a loss and an amount of noise resulting from recovery electric current can be reduced in the overall system. Consequently, the levels of noise terminal voltage, radiation noise, etc. are reduced, and a circuit loss is suppressed. Thus, a noise filter can be reduced in size, and cost reduction can be achieved.

Furthermore, the commutation power supply 75 for the transformer driving circuit 73 can also be used as a common power supply serving as either one of a drive power supply (i.e., a gate drive power supply, not shown) for driving the short-circuiting means 4 (i.e., for opening and closing the short-circuiting switch 42) or a power supply (not shown) for the control means 102. Therefore, it is not necessary to add another power supply, so that an increase in cost can be avoided.

A Schottky barrier diode, which has good recovery characteristics, low forward voltage, a low loss, and high voltage resistant characteristics, may be used as the commutation rectifying element 72. Alternatively, a wide band-gap semiconductor element composed of SiC (silicon carbide), GaN (gallium nitride), diamond, etc. may be used. The use of these elements leads to an increase in crystal defects as well as an increase in cost as a permissible effective electric-current value becomes higher in the specifications thereof. Since an element with a low permissible effective electric-current value can be used as the commutation rectifying element 72 according to Embodiment 1, a highly-efficient power converting device with a good cost-to-performance ratio can be achieved.

Furthermore, with the intervention of the transformer 71, the rectifying circuit 3 constituted of the rectifying elements 3a to 3d, the secondary winding of the transformer 71, and the commutation rectifying element 72 can be insulated from the transformer driving circuit 73 and the control means 102. Therefore, a signal for driving the commutating means 7 can be injected relatively easily. Moreover, a highly safe and reliable system can be formed.

Figure 9:
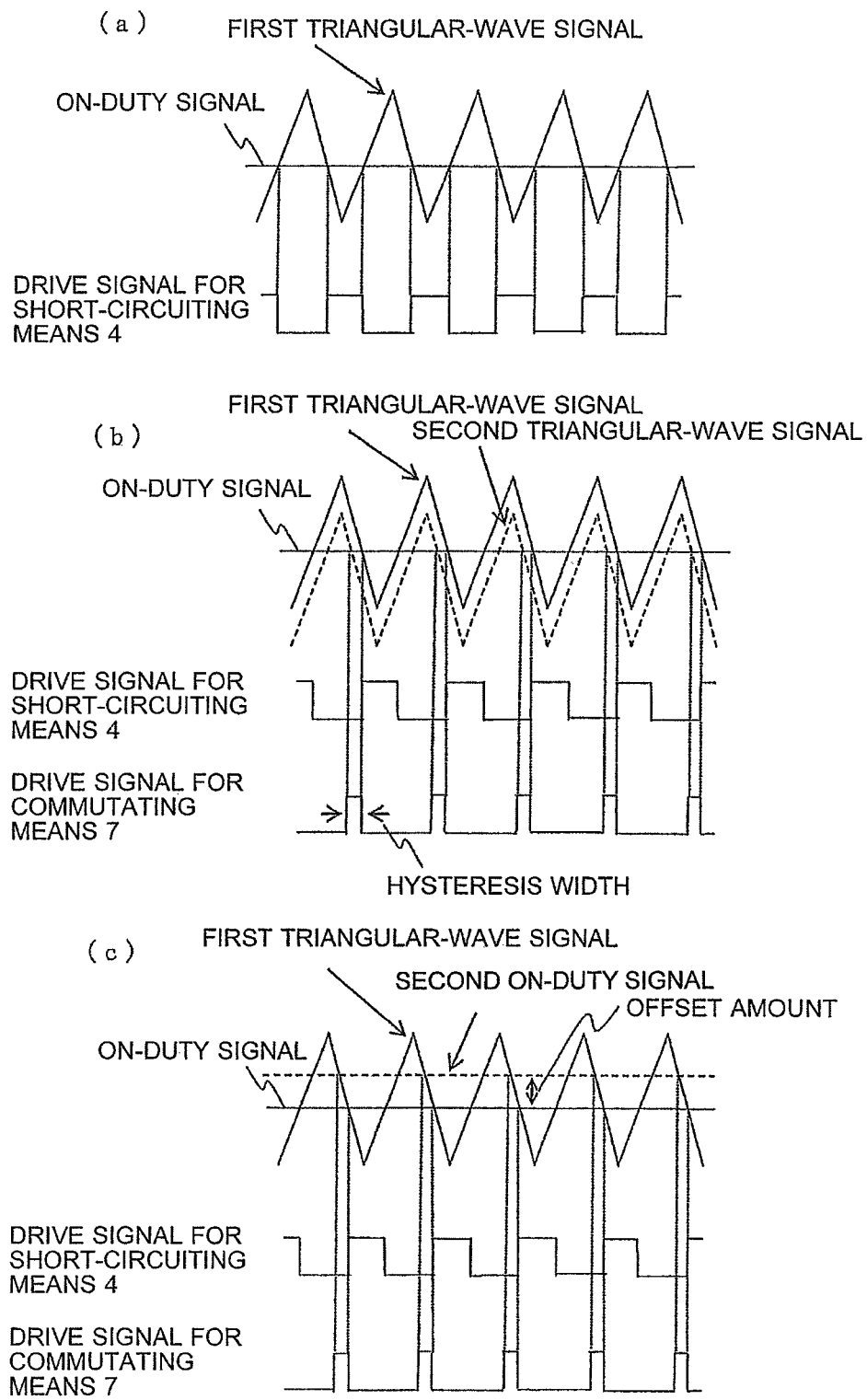
FIG. 9 illustrates examples of operation waveforms performed by a drive-signal generating unit according to Embodiment 1.

FIG. 9 illustrates examples of operation waveforms of the drive-signal generating unit 103. FIG. 9(*a*) shows a waveform related to an operation in which the drive-signal generating unit 103 generates a drive signal for the short-circuiting switch 42 on the basis of an on-duty signal for the short-circuiting switch 42 output from the control means 102 when the commutating means 7 is not actuated. For example, a first triangular-wave signal prepared in advance is compared with the on-duty signal for the short-circuiting switch 42 output from the control means 102. If the on-duty signal is the larger, a drive signal for switching on the short-circuiting switch 42 is transmitted. On the other hand, if the triangular-wave signal is the larger, a drive signal for switching off the short-circuiting switch 42 is transmitted. In this case, for example, the basis for determining whether or not the active directions and the thresholds of the two signals are to be included in the on-state may be changed, where necessary.

FIG. 9(b) illustrates an example of waveforms related to an operation for generating drive signals for the short-circuiting switch 42 and the commutation switch 74 when the commutating means 7 is actuated. With regard to the drive signal for the short-circuiting means 4 (i.e., the short-circuiting switch 42), the first triangular-wave signal is compared with the on-duty signal output from the control means 102, and the drive signal is generated in accordance with a procedure similar to that described with reference to FIG. 9(a).

On the other hand, the drive signal for the commutating means 7 (i.e., the commutation switch 74) is generated by using the first triangular-wave signal in addition to a second triangular-wave signal having a predetermined hysteresis width. For example, in the fall section (i.e., the second half) of each of the first and second triangular-wave signals, if the first triangular-wave signal is larger than a reference signal when the value of the second triangular-wave signal and the value of the on-duty signal are equal to each other, the drive signal for the commutating means 7 is set to an on-state. On the other hand, if the second triangular-wave signal is smaller than the on-duty signal when the value of the first triangular-wave signal and the value of the on-duty signal are equal to each other, the drive signal for the commutating means 7 is set in to an off-state.

The first triangular-wave signal, the second triangular-wave signal, and the on-duty signal satisfy the aforementioned relationships so that the drive signal for the commutating means 7 is switched between the on-state and the off-state. In this case, for example, an ON timing (i.e., a commutation-operation start timing) for the commutating means 7 may be set in view of, for example, a retardation time for starting the commutation toward the commutation rectifying element 72 by actuating the transformer 71 in response to an output of the drive signal for the commutating means 7. An OFF timing for the commutating means 7 may be set in view of, for example, a retardation time of the transformer driving circuit 73, a reverse recovery time (normally, several hundreds of nanoseconds to several microseconds) of the rectifying element 3a, and a reverse recovery time (normally, several nanoseconds to several hundreds of nanoseconds) of the commutation rectifying element 72. For example, the basis for determining whether or not the active directions and the thresholds of the three signals are to be included in the on-state may be changed, where necessary.

The determination of whether each triangular-wave signal is in the fall section (i.e., the second half) may be performed by, for example, periodically determining whether the triangular-wave signal is in the first half or the second half by using, for example, a timer when the triangular-wave signal is generated. Furthermore, the determination may be performed on the basis of determination of an ON timing and an OFF timing of the triangular-wave signal by managing the time (i.e., by counting the elapsed time) of the signal.

Although the drive signal for the commutating means 7 is generated on the basis of the first and second triangular-wave signals and the on-duty signal, the generating method is not limited to the above. For example, as shown in FIG. 9(c), a second on-duty signal having an offset amount equivalent to a hysteresis amount between the first triangular-wave signal and the second triangular-wave signal may be generated, and the drive signal for the commutating means 7 may be generated on the basis of the two on-duty signals and the first triangular-wave signal.

Embodiment 1 has been described above on the basis of the configuration in FIG. 1. For example, the rectifying element 3b is similar to the rectifying element 3a in having a function of preventing the electric current from flowing backward from the smoothing means 5, in addition to rectifying the electric power from the alternating-current power supply 1. Therefore, a similar effect can be achieved by, for example, connecting commutating means having a configuration similar to that of the commutating means 7 to an element functioning as a backflow preventing element, such as providing the rectifying element 3b with the commutating means 7, and by performing commutation of the electric current. By providing the commutating means 7 in both the rectifying elements 3a and 3b and applying commutation control, the effects of noise reduction and loss reduction can be further increased.

The timing at which the recovery electric current is generated in the rectifying elements 3a and 3b varies depending on the phase of power-supply voltage. Of the terminals connected to the alternating-current power supply 1, if the terminal connected to the reactor 2 has the higher electric potential, the electric-current path extends through the rectifying element 3a, as described above. In contrast, if the terminal connected to the reactor 2 has the lower electric potential, the electric-current path extends through the rectifying element 3b.

Figure 10:
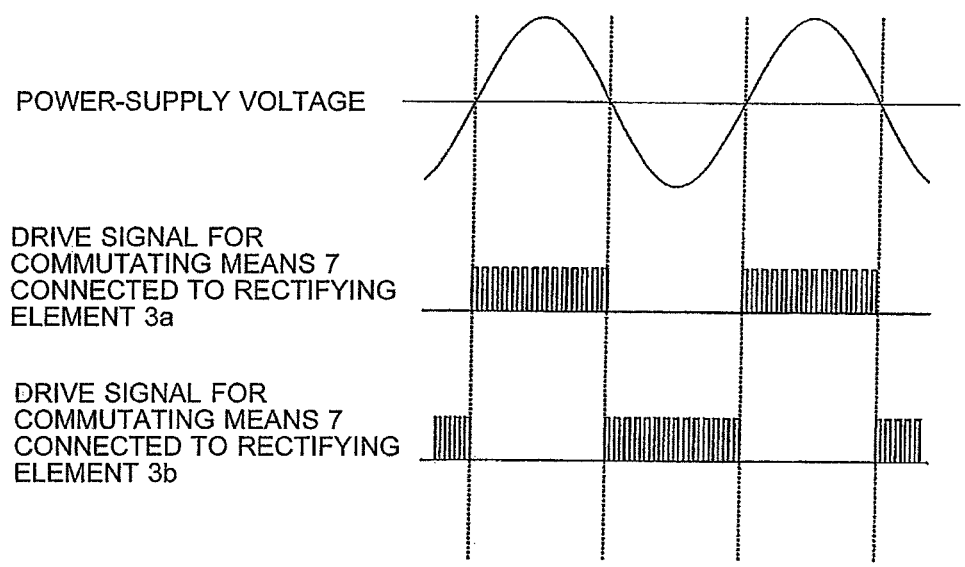
FIG. 10 illustrates a drive signal for the commutating means 7 based on the phase of a power supply according to Embodiment 1.

FIG. 10 illustrates the relationship between power-supply voltage and drive signals in the case where the rectifying elements 3a and 3b are each provided with the commutating means 7. As shown in FIG. 10, it may be determined whether the commutating means 7 connected to the rectifying element 3a is to be actuated or the commutating means 7 connected to the rectifying element 3b is to be actuated in accordance with the phase of the power-supply voltage. In this case, the phase of the power-supply voltage may be determined by, for example, detecting zero-crossing of the power-supply voltage. Furthermore, with regard to the drive signal for each commutating means 7, for example, the drive-signal generating unit 103 may generate the drive signal in the above-described manner and decide to which one of the commutating means 7 the drive signal is to be transmitted on the basis of the phase of the power-supply voltage.

With regard to each of the rectifying elements 3c and 3d, the anode side thereof is connected to the negative side of the bus of the circuit. Therefore, like the rectifying elements 3a and 3b, the recovery electric current is less likely to be generated in the rectifying elements 3c and 3d even when reverse bias voltage is applied thereto. However, the effects of noise reduction and loss reduction can be further increased by applying commutation control.

Accordingly, in the power converting device according to Embodiment 1, the commutating means 7 is connected in parallel with the rectifying element 3a serving as a backflow preventing element, and the electric current flowing in the forward direction from the alternating-current power supply 1 toward the load 6 is commutated to the smoothing means 5 through a different path so that, for example, by opening and closing the short-circuiting switch 42, the rectifying element 3a is reverse-recovered before the electric current flows backward from the load 6 (smoothing means 5) side. Thus, the recovery electric current occurring in a semiconductor element, such as a diode, when a backward-flowing electric current flows thereto is generated via the commutation rectifying element 72, which requires a short time for reverse recovery and has good recovery characteristics, instead of the rectifying element 3a, which has low forward voltage but in which a large amount of recovery electric current is generated, whereby the recovery electric current in the circuit can be reduced.

When a commutation operation is not performed (i.e., normal mode), the electric current is made to flow toward the rectifying element 3a with the low forward voltage, so that a loss of electric power, caused by the element, flowing toward the load 6 can be suppressed. Therefore, for example, even when an element having large current-carrying capacity is used as the rectifying element 3a serving as a backflow preventing element during the normal mode, a commutation operation is performed so that a recovery loss and a conduction loss can be reduced regardless of, for example, the recovery characteristics of the rectifying element 3a in the event of backflow of the electric current. Consequently, a loss and an amount of noise resulting from the recovery electric current can be reduced in the overall system even if, for example, the commutation operation is performed by the commutating means 7.

Furthermore, a circuit loss resulting from the recovery electric current is suppressed, and the levels of noise terminal voltage, radiation noise, etc. are reduced. Thus, a noise filter can be reduced in size, and cost reduction and the like can be achieved. Moreover, this is effective for coping with EMC.

Furthermore, the commutation power supply 75 for the transformer driving circuit 73 can also be used as a common power supply serving as either one of the drive power supply for driving the short-circuiting means 4 (i.e., the short-circuiting switch 42) or the power supply (not shown) for making the control means 102 perform processing. Therefore, it is not necessary to add another power supply, so that an increase in cost can be avoided.

Furthermore, since a wide band-gap semiconductor is used as the commutation rectifying element 72, a low-loss power converting device can be obtained. Moreover, due to a low electric-power loss, increased efficiency of the element can be achieved. Because a wide band-gap semiconductor has a high permissible electric-current density, the element can be reduced in size, and the means having the element built therein can also be reduced in size. If there is no loss in the entire system including, for example, the commutation switch 74, in addition to the commutation rectifying element 72, a wide band-gap semiconductor may be used for another element.

As an alternative to a wide band-gap semiconductor, for example, a Schottky barrier diode, which has low forward voltage, a low loss, and high voltage resistant characteristics, may be used as the commutation rectifying element 72. The use of these elements leads to an increase in crystal defects as well as an increase in cost as a permissible effective electric-current value becomes higher in the specifications thereof. In the power converting device (system) according to Embodiment 1, since the time in which the electric current flows through the different path is short, an element with a low permissible effective electric-current value (i.e., small current-carrying capacity) can be used as the commutation rectifying element 72 in the commutating means 7, whereby a highly-efficient power converting device with a good cost-to-performance ratio can be achieved.

Furthermore, with the transformer 71, the rectifying element 3a, the secondary winding of the transformer 71, and the commutation rectifying element 72, which are disposed on the circuit between the alternating-current power supply 1 and the load 6, can be insulated from the transformer driving circuit 73, the control means 102, and the drive signal for the commutating means 7, so that the transmission of the drive signal toward the commutating means 7 can be performed relatively easily. Moreover, means to which high voltage is applied and means actuated with low voltage can be electrically isolated from each other. Furthermore, a highly safe and reliable system can be formed. Although a commutation operation is performed by the transformer 71 and the transformer driving circuit 73 in Embodiment 1, the means and the configuration may be changed so long as the commutation operation for commutating the electric current to a different path can be performed, although there is a possibility that the aforementioned effect cannot be exhibited.

Embodiment 2

Figure 11:
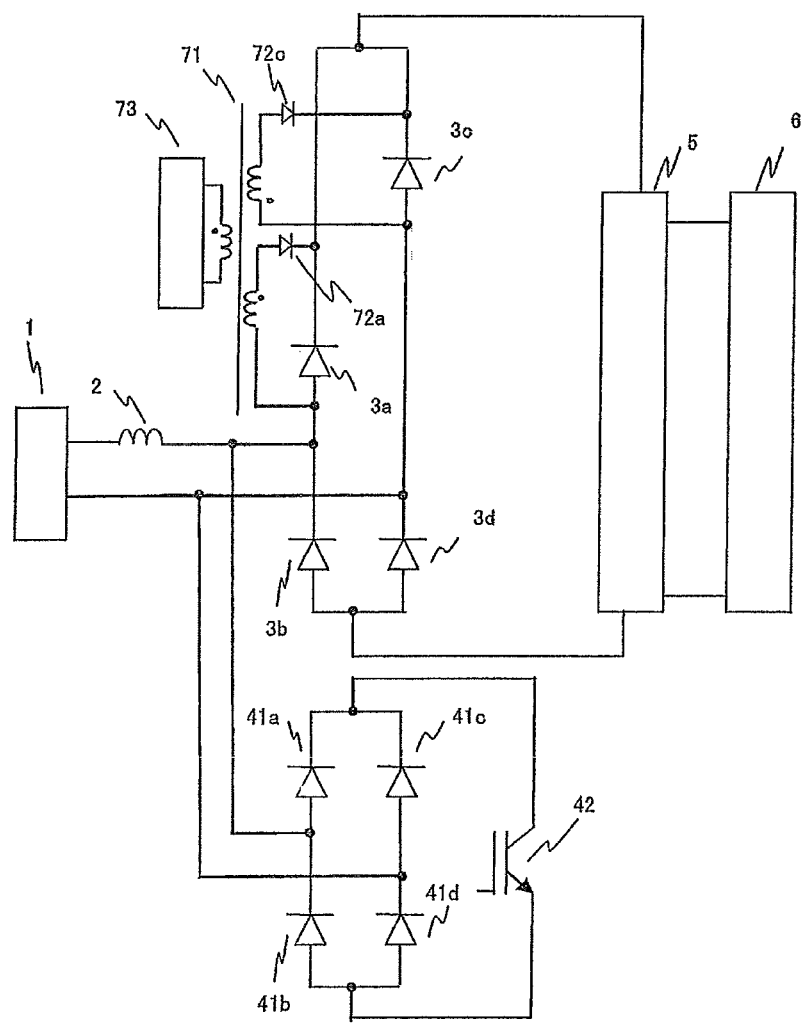
FIG. 11 illustrates a configuration example of a power converting device according to Embodiment 2 of the present invention.

FIG. 11 illustrates a configuration example of a power converting device according to Embodiment 2. In FIG. 11, means, elements, and the like that perform operations similar to those in FIG. 1 are given the same reference numerals. In FIG. 11, the commutating means 7 is connected to the rectifying elements 3a and 3c.

Figure 12:
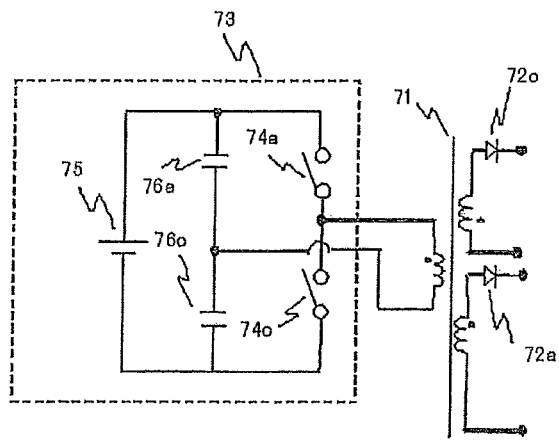
FIG. 12 illustrates a configuration example of commutating means according to Embodiment 2.

FIG. 12 illustrates a configuration example of the commutating means 7 according to Embodiment 2. In Embodiment 2, in the commutating means 7 connected to the rectifying elements 3a and 3c, the primary winding of the transformer 71 and the transformer driving circuit 73 that supplies electric power to the primary winding are integrated with each other. A commutation rectifying element 72a that is connected in series with one of secondary windings of the transformer 71 is connected in parallel with the rectifying element 3a. A commutation rectifying element 72c that is connected in series with another secondary winding of the transformer 71 is connected in parallel with the rectifying element 3c. In order to vary the timing for performing a commutation operation, the secondary winding of the transformer 71 that is connected to the commutation rectifying element 72a and the secondary winding of the transformer 71 that is connected to the commutation rectifying element 72c are given opposite polarities. The transformer driving circuit 73 in Embodiment 2 is constituted of commutation switches 74a and 74c, the commutation power supply 75, and capacitors 76a and 76c.

FIG. 13 illustrates examples of electric-current paths according to Embodiment 2. FIG. 13(a) illustrates an electric-current path when the short-circuiting switch 42 and the commutation switches 74a and 74c are in an off-state. FIG. 13(b) illustrates a state where the short-circuiting switch 42 is switched on. The commutation switches 74a and 74c are switched off. In FIGS. 13(a) and 13(b), operations similar to those in FIGS. 5(a) and 5(b) described in Embodiment 1 are performed.

On the other hand, FIG. 13(c) illustrates an electric-current path corresponding to a case where a commutation operation is performed toward the rectifying element 3a in a state where the short-circuiting switch 42 is switched off. As described above in Embodiment 1, the timing at which a recovery electric current is generated in the rectifying elements 3a and 3c varies therebetween. Therefore, as described above, the timing for performing the commutation operation is varied by giving different polarities to the secondary winding of the transformer 71 that is connected to the commutation rectifying element 72a and the secondary winding of the transformer 71 that is connected to the commutation rectifying element 72c.

For example, in the commutating means 7 in FIG. 12, when the commutation switch 74a is switched on and the commutation switch 74c is switched off, the capacitor 76a discharges electricity so that an excitation current flows through the primary winding of the transformer 71. In this case, an electric current flows through the secondary winding, whose polarity is the same as that of the primary winding of the transformer 71, at the commutation rectifying element 72a side, whereby a commutation operation commences at the commutation rectifying element 72a side.

On the other hand, when the commutation switch 74a is switched off and the commutation switch 74c is switched on, the capacitor 76c discharges electricity so that the excitation current flows through the primary winding of the transformer 71 in a direction opposite to that when the commutation switch 74a is switched on and the commutation switch 74c is switched off. In this case, the electric current flows through the secondary winding, whose polarity is opposite to that of the primary winding of the transformer 71, at the commutation rectifying element 72c side, whereby a commutation operation commences at the commutation rectifying element 72c side.

Although the transformer driving circuit 73 is described above with reference to an example in which the commutation switches 74a and 74c constitute a half-bridge configuration, the configuration is not limited to the above. A similar commutation operation can be realized and a similar effect can be achieved with, for example, a full-bridge configuration by increasing the number of the commutation switches 74.

Accordingly, with the power converting device according to Embodiment 2, for example, even in the case where commutation operations are to be performed at different timings for the rectifying elements 3a and 3c, the secondary windings of the transformer 71 and the commutation rectifying elements 72a and 72c are respectively connected in parallel with the rectifying elements 3a and 3c, as in Embodiment 1, and can share the transformer driving circuit 73 that controls the supply of power to the primary winding of the transformer 71, so that the number of components in the circuit can be reduced while noise reduction and loss reduction are achieved due to reduction in the recovery electric current, as in Embodiment 1, thereby reducing the circuit area and suppressing an increase in cost. Furthermore, the relationship between the rectifying elements 3b and 3d in terms of the timing at which the recovery electric current is generated therein is the same as that between the rectifying elements 3a and 3c. If commutating means is to be connected to the rectifying elements 3b and 3d, a transformer driving circuit can be shared by the elements by employing the configuration shown in FIG. 12, so that a commutation operation can be performed toward each rectifying element.

Figure 14:
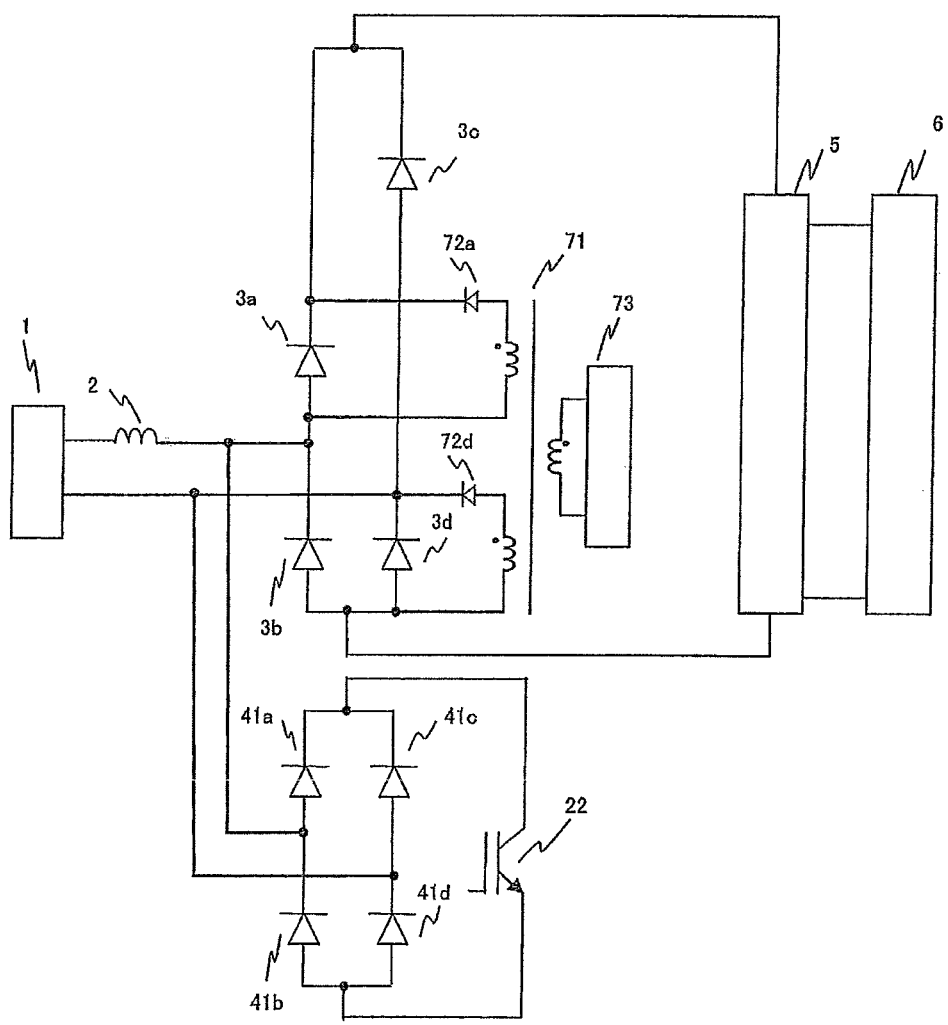
FIG. 14 illustrates another configuration example of the power converting device according to Embodiment 2.

FIG. 14 illustrates another configuration example of the power converting device according to Embodiment 2. In FIG. 14, the commutating means 7 is connected to the rectifying elements 3a and 3d. Furthermore, the timing at which the recovery electric current is generated in the rectifying element 3a and the rectifying element 3d is the same, although the magnitude of the generated recovery electric current varies therebetween. Therefore, in the case where the commutating means 7 is to be connected to the combination of the rectifying elements 3a and 3d, the configuration shown in FIG. 14 can be employed. In this case, the transformer driving circuit 73 can be realized by employing the configuration shown in FIG. 3, as in Embodiment 1. The same applies to a combination of the rectifying element 3b and the rectifying element 3c.

Figure 15:
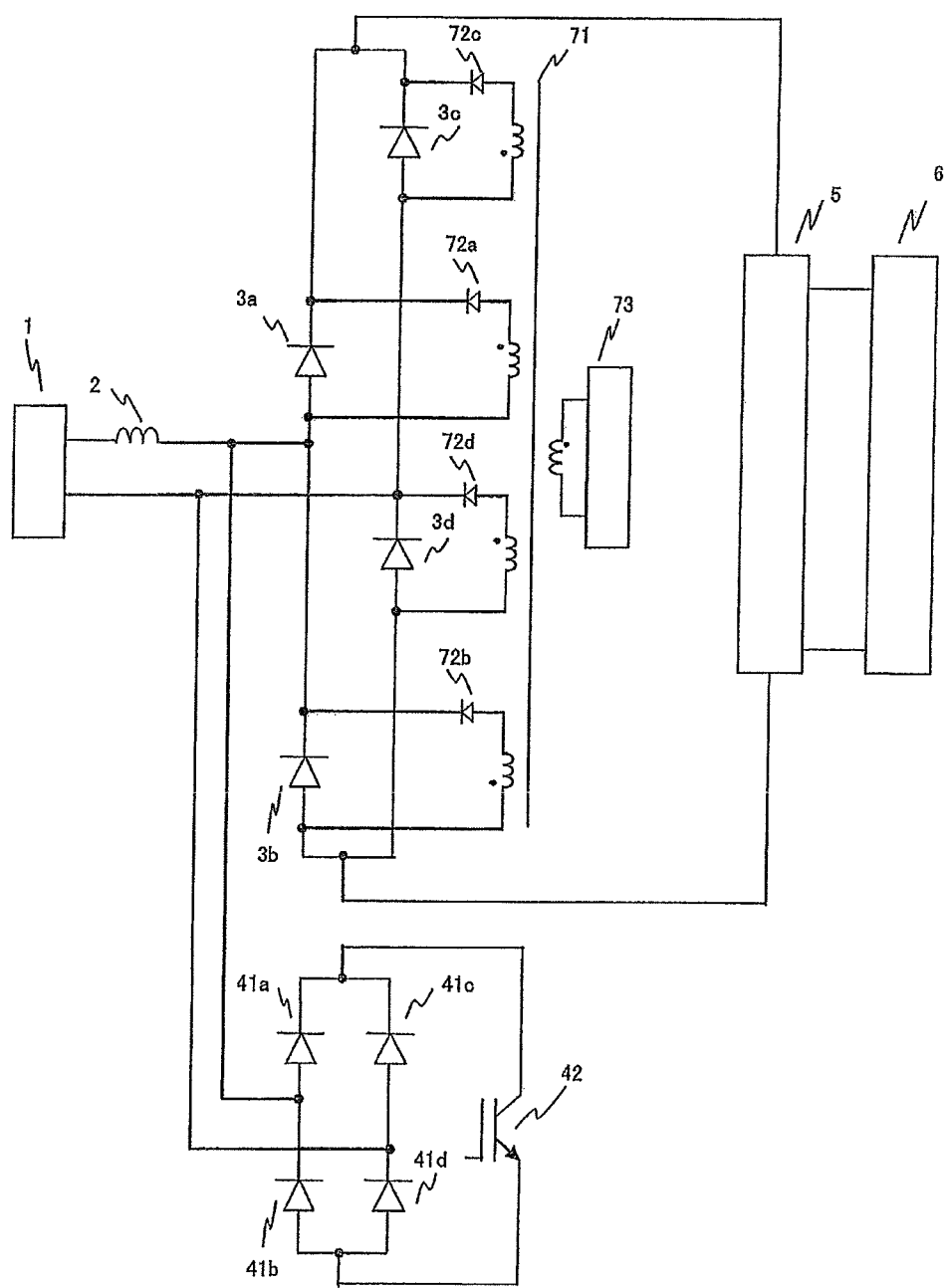
FIG. 15 illustrates another configuration example of the power converting device according to Embodiment 2.

FIG. 15 illustrates another configuration example of the power converting device according to Embodiment 2. In the configuration in FIG. 15, the commutating means 7 is connected to all of the rectifying elements 3a to 3d. In this case, as shown in FIG. 15, the transformer driving circuit 73 may be shared among the elements. As described above, the timing at which the recovery electric current is generated is the same in the combination of the rectifying elements 3a and 3d and in the combination of the rectifying elements 3b and 3c. On the other hand, since the generated timing varies between the rectifying elements 3a and 3d and the rectifying elements 3b and 3c, the transformer driving circuit 73 may have the configuration shown in FIG. 12. In the configuration in FIG. 15, the commutation switch 74 may have a full-bridge configuration, and a similar operation and a similar effect can be achieved. With such a configuration, the number of components in the circuit can be reduced while noise reduction and loss reduction are achieved due to reduction in the recovery electric current, as in Embodiment 1, thereby reducing the circuit area and suppressing an increase in cost.

Embodiment 3

FIG. 16 illustrates a configuration example of a power converting device according to Embodiment 3. In FIG. 16, means, elements, and the like that perform operations similar to those in, for example, FIG. 1 are given the same reference numerals. As shown in FIG. 16, the smoothing means 5 according to Embodiment 3 is constituted of smoothing means 5a and smoothing means 5b that are connected in series. Furthermore, a connection point between the smoothing means 5a and the smoothing means 5b is connected to one of the terminals of the alternating-current power supply 1.

FIG. 17 illustrates examples of electric-current paths according to Embodiment 3. FIG. 17 shows a case where one of the terminals, which is connected to the reactor 2, of the alternating-current power supply 1 has the higher electric potential. FIG. 17(a) illustrates an electric-current path when the short-circuiting switch 42 and the commutation switch 74 are in an off-state. In this case, the smoothing means 5a is electrically charged. In a case where the terminal connected to the reactor 2 has the lower electric potential, since the smoothing means 5b is electrically charged, the direct-current voltage applied to the load 6 is twice as large as the direct-current voltage applied thereto when full-wave rectification is performed (voltage doubler rectification).

FIG. 17(b) illustrates a state where the short-circuiting switch 42 is switched on. The commutation switch 74 is switched off. In this case, a short-circuit current flows similarly to that in Embodiment 1. FIG. 17(c) illustrates a state where the short-circuiting switch 42 is switched off and the commutation switch 74 is switched on. Similar to the case described in Embodiment 1, the transformer 71 is excited, and the electric current flows into a path formed by the secondary side of the transformer 71 in the commutating means 7 and the commutation rectifying element 72 so as to become completely commutated.

Figure 18:
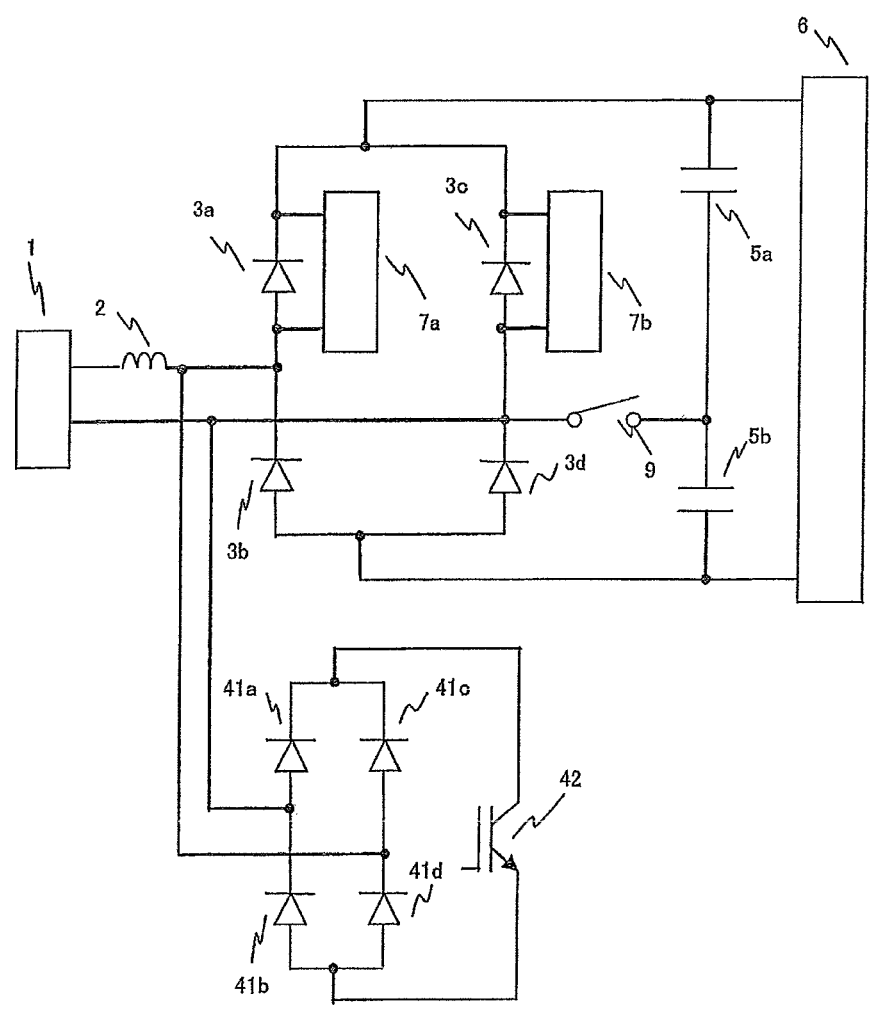
FIG. 18 illustrates another configuration example of the power converting device according to Embodiment 3.

FIG. 18 illustrates another configuration example of the power converting device according to Embodiment 3. In the power converting device in FIG. 18, a connection point between the rectifying elements 3c and 3d and a connection point between the smoothing means 5a and the smoothing means 5b are connected to each other via a switch 9. When the switch 9 is switched off, an operation similar to that described in Embodiment 1 and Embodiment 2 is performed. When the switch 9 is switched on, an operation similar to that described with reference to FIG. 16 is performed. Therefore, it is possible to switch between full-wave rectification and voltage doubler rectification by opening and closing the switch 9.

FIG. 19 illustrates other configuration examples of the power converting device according to Embodiment 3. In FIG. 19, the power converting device has a resonant capacitor 10 and supplies power by utilizing resonance with the reactor 2. In FIG. 19(b), the smoothing means 5 is constituted of the smoothing means 5a and the smoothing means 5b that are connected in series. Moreover, backflow preventing elements 8a and 8b that prevent the electric current from flowing backward from the smoothing means 5 are provided.

Accordingly, with the power converting device according to Embodiment 3, commutating means 7a and commutating means 7b that are similar to the commutating means 7 according to Embodiment 1 and Embodiment 2 are provided, and a commutation operation of each of the commutating means 7a and the commutating means 7b is controlled in accordance with the operation of the short-circuiting means 4, so that a recovery electric current can be reduced. Thus, noise reduction and loss reduction can be advantageously achieved or size reduction of the circuit and suppression of a cost increase can be advantageously achieved, as in Embodiment 1 and Embodiment 2.

Embodiment 4

Figure 20:
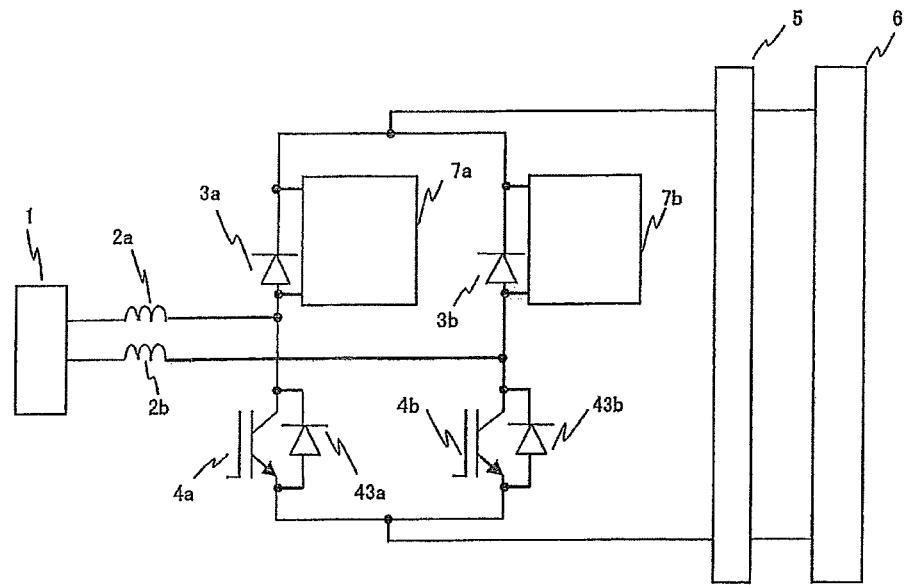
FIG. 20 illustrates a configuration example of a power converting device according to Embodiment 4 of the present invention.

FIG. 20 illustrates an example of a power converting device according to Embodiment 4. In FIG. 20, means, elements, and the like that perform operations similar to those in, for example, FIG. 1 are given the same reference numerals. As shown in FIG. 20, in Embodiment 4, the two terminals connected to the alternating-current power supply 1 are connected to reactors 2a and 2b, respectively.

A connection point between the reactor 2a and the rectifying element 3a and a connection point between the reactor 2b and the rectifying element 3b are connected to short-circuiting means 4a and short-circuiting means 4b, respectively. The short-circuiting means 4a is connected in parallel with a reflux diode 43a, and the short-circuiting means 4b is connected in parallel with a reflux diode 43b. The short-circuiting means 4a and the short-circuiting means 4b are connected via the reactors 2a and 2b. When one of the terminals of the alternating-current power supply 1 has a phase with a high electric potential, the corresponding short-circuiting means 4 is made to perform a short-circuiting operation.

Accordingly, with the power converting device according to Embodiment 4, the commutating means 7a and the commutating means 7b that are similar to the commutating means 7 in Embodiment 1 and Embodiment 2 are provided, and commutation control of the commutating means 7a and the commutating means 7b is performed in accordance with the operation of the short-circuiting means 4a and the short-circuiting means 4b that are similar to the short-circuiting means 4, so that a recovery electric current can be reduced. Thus, noise reduction and loss reduction can be advantageously achieved or size reduction of the circuit and suppression of a cost increase can be advantageously achieved, as in Embodiment 1 and Embodiment 2.

Embodiment 5

Figure 21:
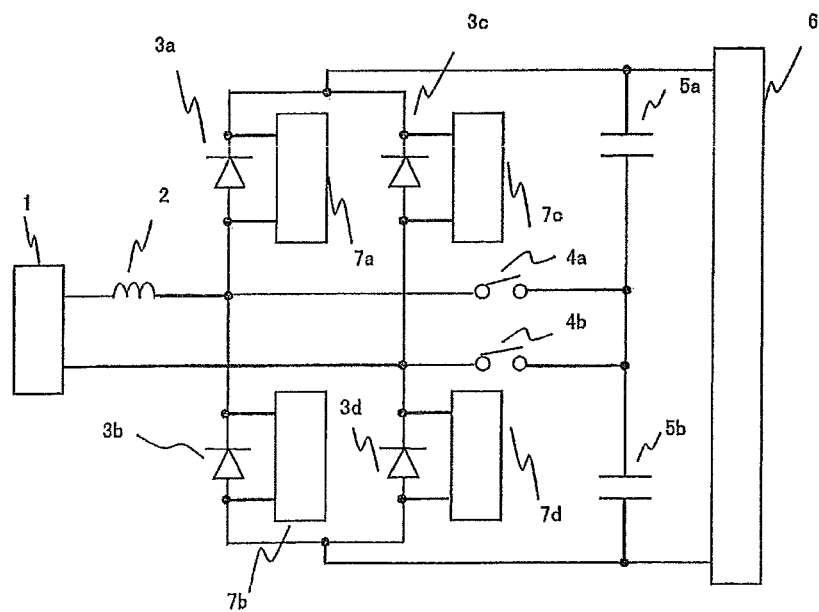
FIG. 21 illustrates a configuration example of a power converting device according to Embodiment 5 of the present invention.

FIG. 21 illustrates a configuration example of a power converting device according to Embodiment 5. In FIG. 21, means, elements, and the like that perform operations similar to those in, for example, FIG. 1 are given the same reference numerals. As shown in FIG. 21, in Embodiment 5, the smoothing means 5 is constituted of the smoothing means 5a and the smoothing means 5b that are connected in series. A connection point between the rectifying elements 3a and 3b is connected to the short-circuiting means 4a, and a connection point between the rectifying elements 3c and 3d is connected to the short-circuiting means 4b. Each of the short-circuiting means 4a and the short-circuiting means 4b is a bidirectional switch realized by, for example, using a rectifying circuit and a switch, as in FIG. 2, or using a plurality of switches.

In the power converting device having the above-described circuit, the commutating means 7 is provided, as in Embodiment 1 or Embodiment 2, and commutation control of the commutating means 7 is performed in accordance with the operation of the short-circuiting means 4a and the short-circuiting means 4b.

Figure 22:
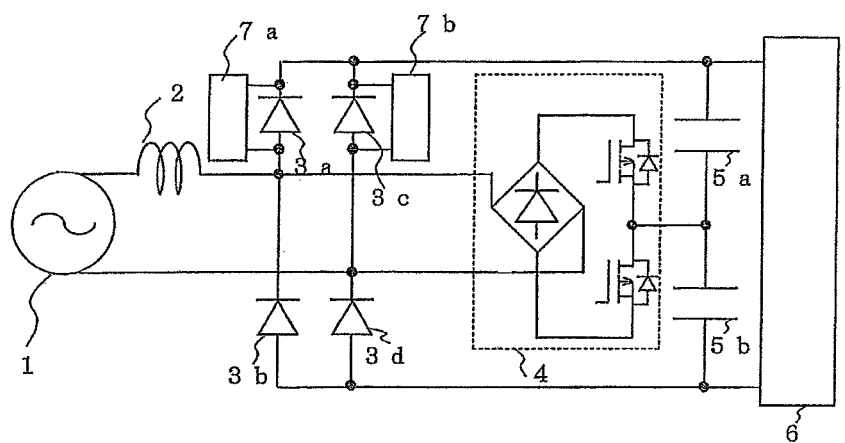
FIG. 22 illustrates another configuration example of the power converting device according to Embodiment 5.

FIG. 22 illustrates another configuration example of the power converting device according to Embodiment 5. In FIG. 22, the short-circuiting means 4 is constituted of a diode bridge and two switches.

Accordingly, even with the configuration shown in each of FIGS. 21 and 22, a recovery electric current can be reduced. Thus, noise reduction and loss reduction can be advantageously achieved or size reduction of the circuit and suppression of a cost increase can be advantageously achieved, as in Embodiment 1, Embodiment 2, etc.

Embodiment 6

Figure 23:
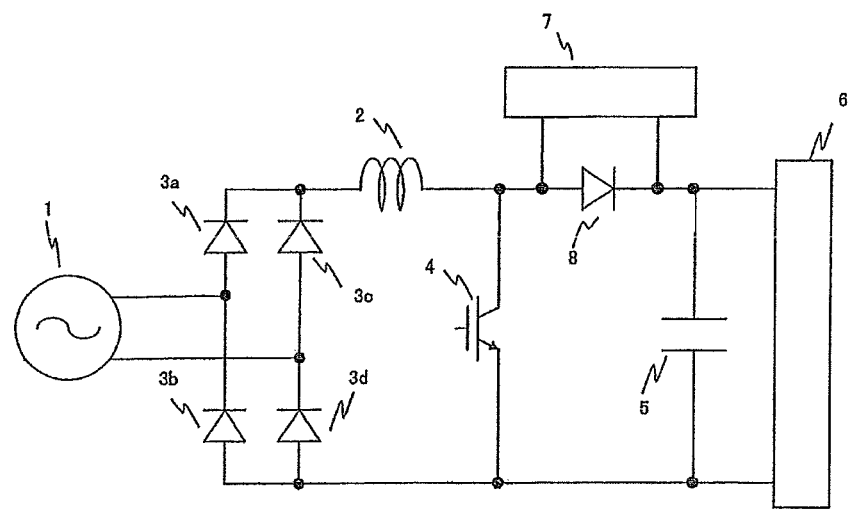
FIG. 23 illustrates a configuration example of a power converting device according to Embodiment 6 of the present invention.

FIG. 23 illustrates a configuration example of a power converting device according to Embodiment 6 of the present invention. In FIG. 23, means, elements, and the like that perform operations similar to those in, for example, FIG. 1 are given the same reference numerals. The short-circuiting means 4 according to Embodiment 6 does not need to be a bidirectional switch, and may be realized by a switch such as an IGBT or a MOS-FET. Furthermore, as shown in FIG. 23, a backflow preventing element 8 for preventing the electric current from flowing backward from the smoothing means 5 is disposed between the short-circuiting means 4 and the smoothing means 5. The backflow preventing element 8 is connected in parallel with the commutating means 7.

For example, the switch of the short-circuiting means 4 is on-off controlled such that output voltage smoothed by the smoothing means 5 is made equal to a desired voltage value. Alternatively, control may be performed such that the input electric current from the alternating-current power supply 1 is made equal to a desired electric-current value. As a further alternative, control may be performed such that the aforementioned output voltage and the aforementioned input electric current are made equal to desired values.

In the power converting device having the above-described circuit, the commutating means 7 is provided, as in, for example, Embodiment 1, and commutation control of the commutating means 7 is performed in accordance with the operation of the short-circuiting means 4. Therefore, a recovery electric current can be reduced, whereby noise reduction and loss reduction can be advantageously achieved or size reduction of the circuit and suppression of a cost increase can be advantageously achieved, as in, for example, Embodiment 1.

Figure 24:
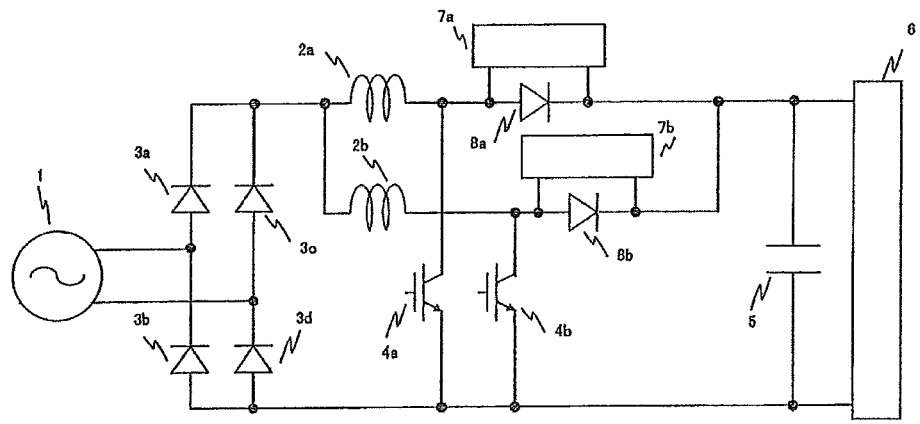
FIG. 24 illustrates another configuration example of the power converting device according to Embodiment 6.

FIG. 24 illustrates another configuration example of the power converting device according to Embodiment 6. The power converting device in FIG. 24 is obtained by providing two parallel-connected systems of reactors 2, short-circuiting means 4, and backflow preventing elements 8 in the power converting device shown in FIG. 23. With regard to the reactors 2, the short-circuiting means 4, and the backflow preventing elements 8, the number of parallel-connected systems is not limited to two and may be more than two.

For example, the switches of the short-circuiting means 4a and the short-circuiting means 4b are on-off controlled such that output voltage smoothed by the smoothing means 5 is made equal to a desired voltage value. Alternatively, control may be performed such that the input electric current from the alternating-current power supply 1 is made equal to a desired electric-current value. As a further alternative, control may be performed such that the aforementioned output voltage and the aforementioned input electric current are made equal to desired values.

In this case, the short-circuiting means 4a and the short-circuiting means 4b do not necessarily need to be switched on and off at the same timing. For example, by performing control with an arbitrary phase difference during a switching cycle, ripple currents occurring in the systems counterbalance each other, so that a ripple current in the input electric current can be reduced. A maximum effect can be achieved when the phase difference is 180 degrees. In the case where three systems are provided, a maximum effect can be achieved when the phase difference is 120 degrees. Accordingly, the effect for counterbalancing the ripple currents is maximized by setting the phase difference to 360 degrees/n when the number of systems is equal to n. The aforementioned effect increases with increasing number of systems.

Figure 25:
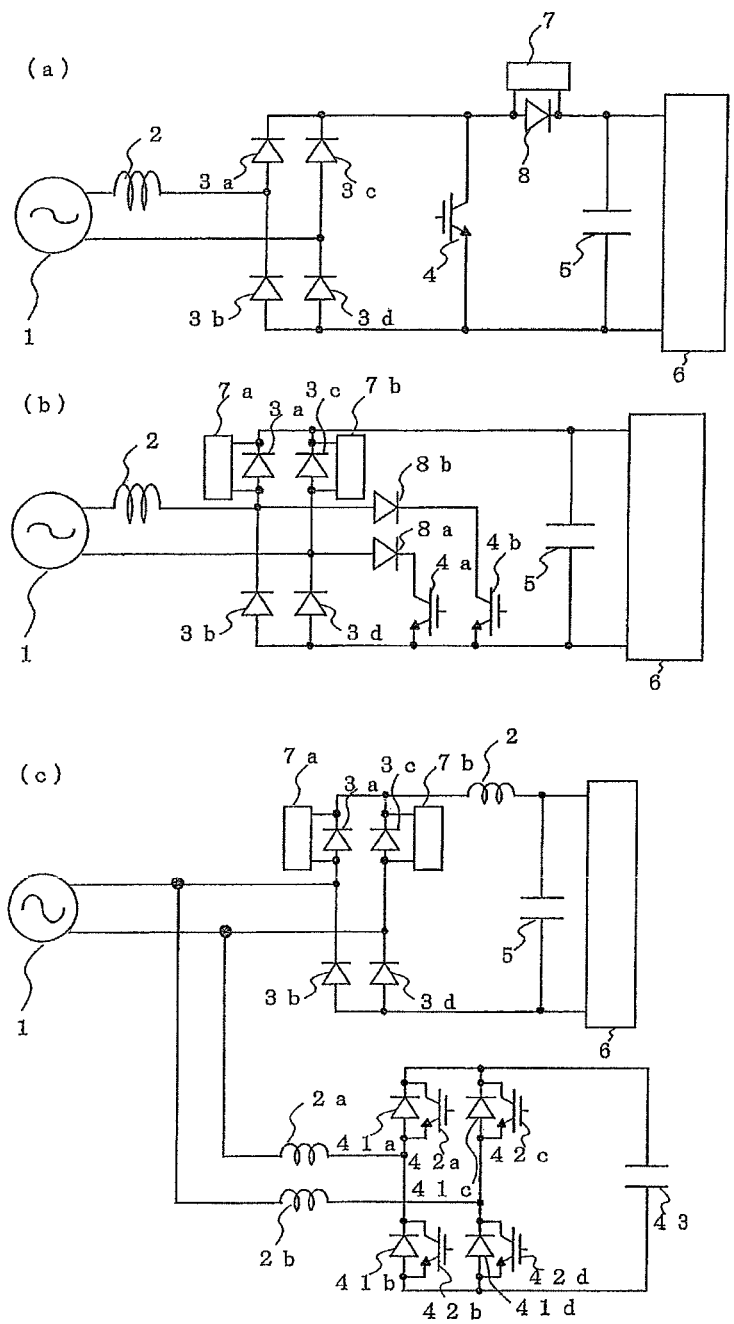
FIG. 25 illustrates other configuration examples of the power converting device according to Embodiment 6.

FIG. 25 illustrates other configuration examples of the power converting device according to Embodiment 6. Contrary to the configuration shown in FIG. 23, the reactor 2 is provided at the alternating-current power supply 1 side in the configuration in FIG. 25(a). FIG. 25(b) shows a modification of the configuration in FIG. 24. In FIG. 25(c), the reactors 2a and 2b are provided on paths of the short-circuiting means 4. The short-circuiting means 4 in FIG. 25(c) includes the rectifying elements 41a to 41d and short-circuiting switches 42a to 42d that are connected in parallel, respectively, and has a short-circuiting capacitor 43 so as to achieve a function of short-circuiting means 4 similar to that in, for example, Embodiment 1 and Embodiment 2.

FIG. 26 illustrates another configuration example of the power converting device according to Embodiment 6. As shown in FIG. 26(a), the power converting device according to Embodiment 6 is a matrix converter. Moreover, for example, a three-phase inductor motor serves as the load 6. As shown in FIG. 26(b), switches 11 (11a to 11i) of the matrix converter are each constituted of a bidirectional switch. Backflow preventing elements and the like that constitute the bidirectional switches are connected to the commutating means 7a and the commutating means 7b, so that commutation control can be performed.

Figure 27:
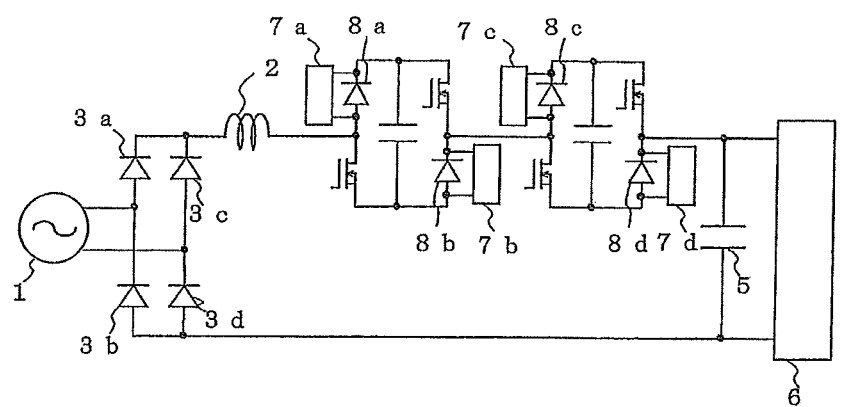
FIG. 27 illustrates another configuration example of the power converting device according to Embodiment 6.
Figure 28:
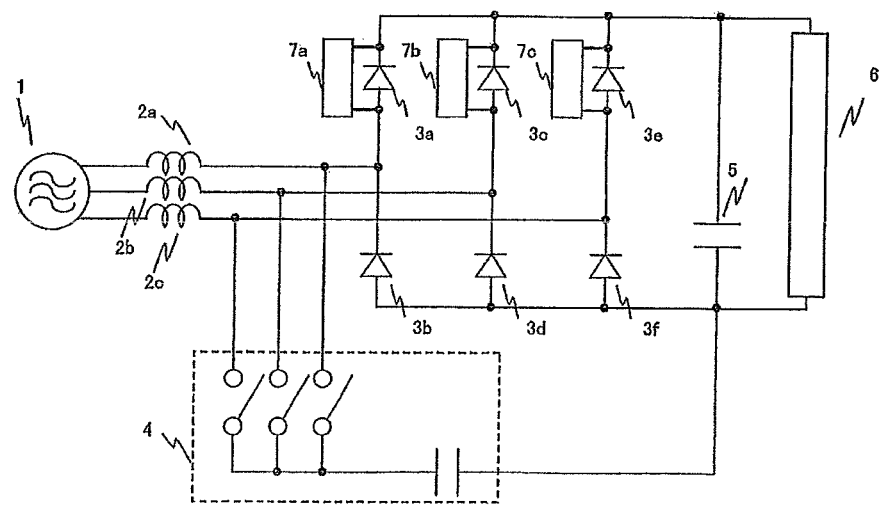
FIG. 28 illustrates a configuration example of a power converting device according to Embodiment 7 of the present invention.
Figure 29:
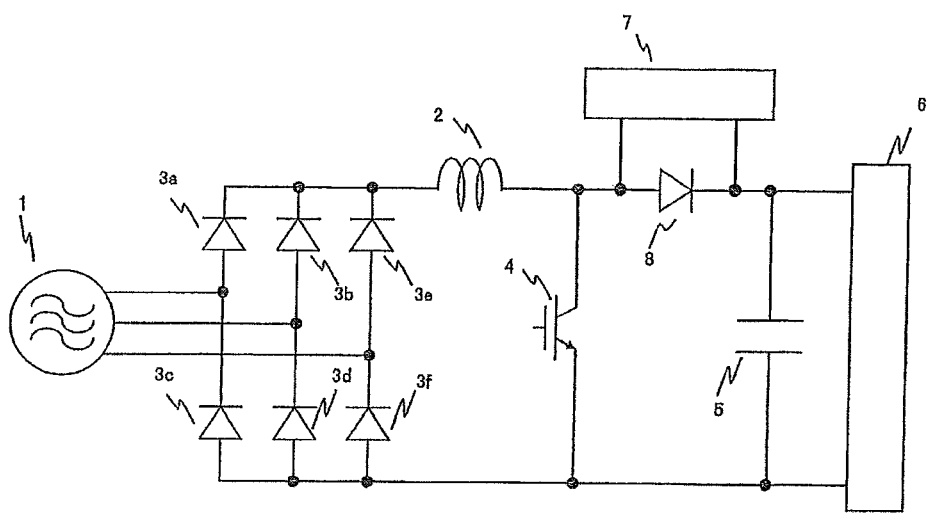
FIG. 29 illustrates another configuration example of the power converting device according to Embodiment 7.
Figure 30:
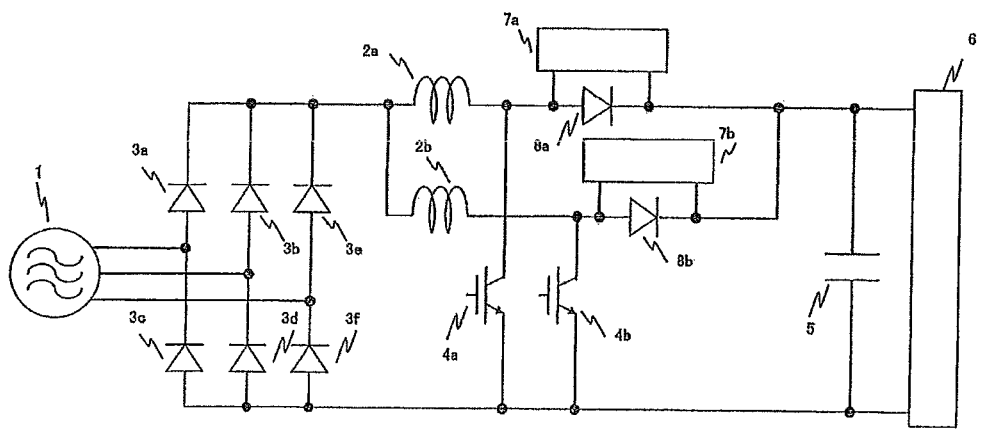
FIG. 30 illustrates another configuration example of the power converting device according to Embodiment 7.
Figure 31:
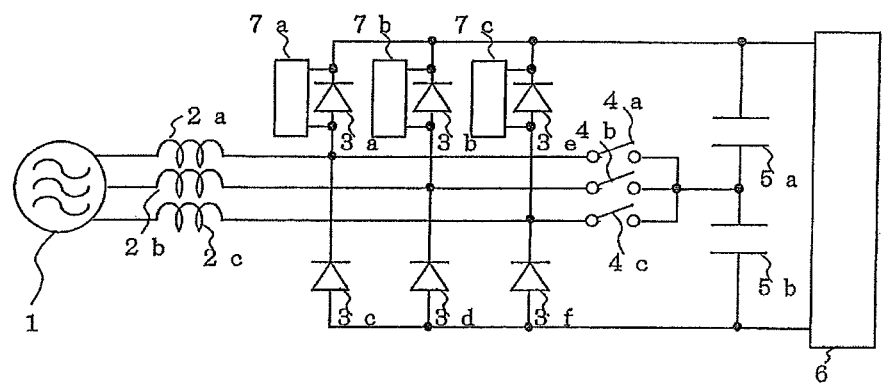
FIG. 31 illustrates another configuration example of the power converting device according to Embodiment 7.
Figure 32:
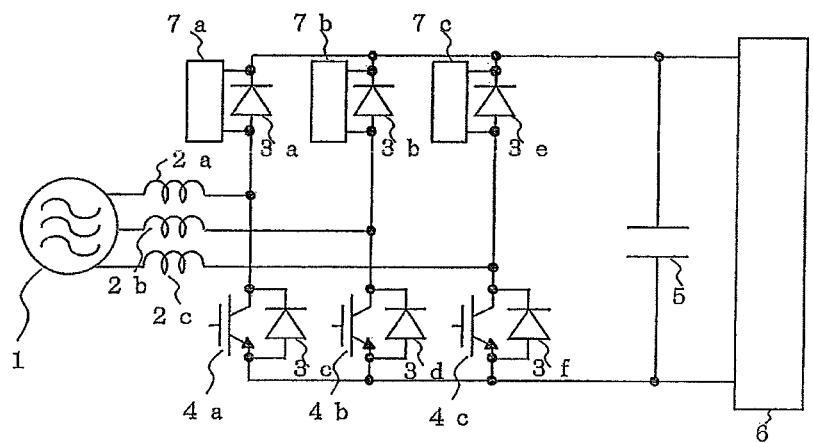
FIG. 32 illustrates another configuration example of the power converting device according to Embodiment 7.
Figure 33:
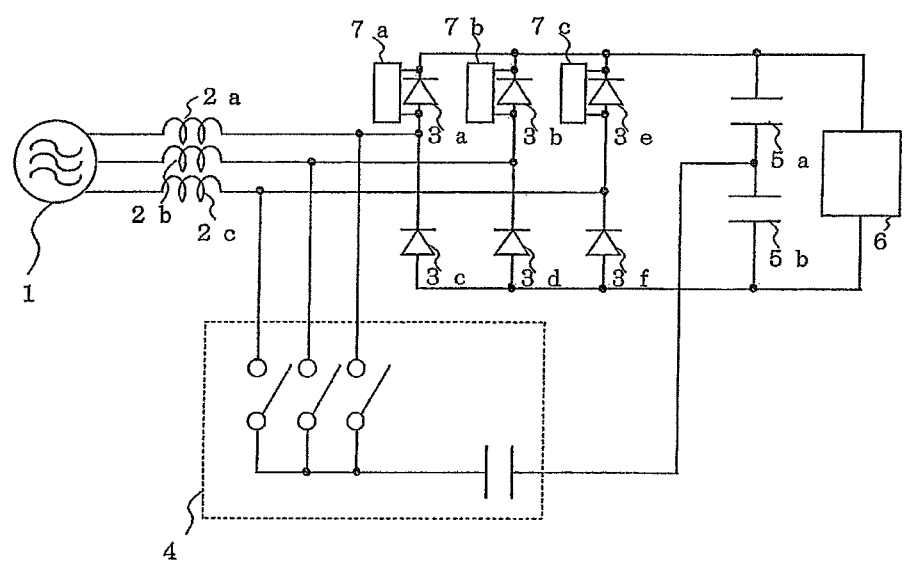
FIG. 33 illustrates another configuration example of the power converting device according to Embodiment 7.
Figure 34:
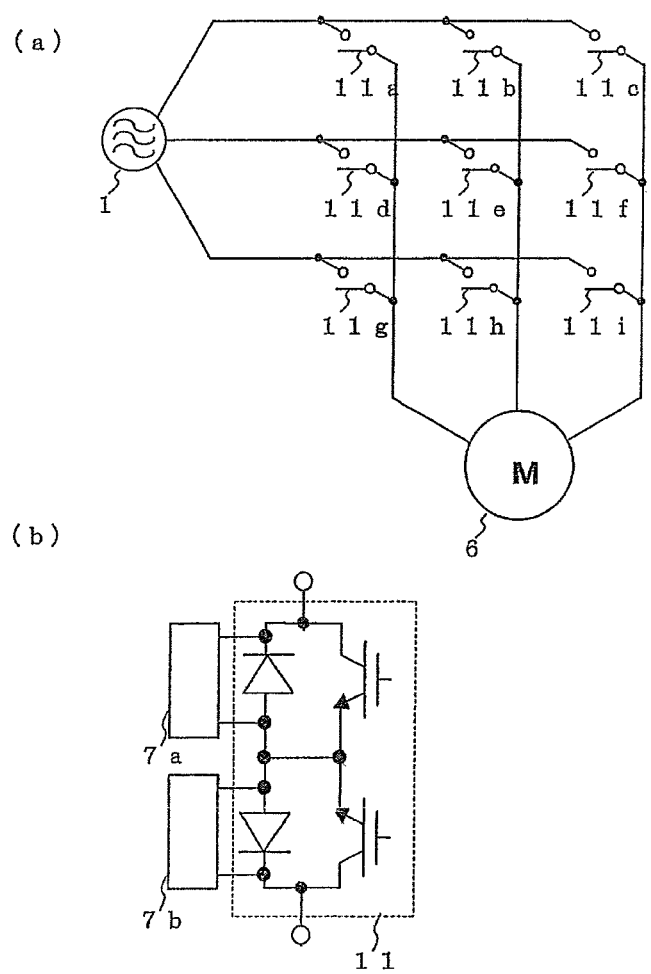
FIG. 34 illustrates another configuration example of the power converting device according to Embodiment 7.
Figure 36:
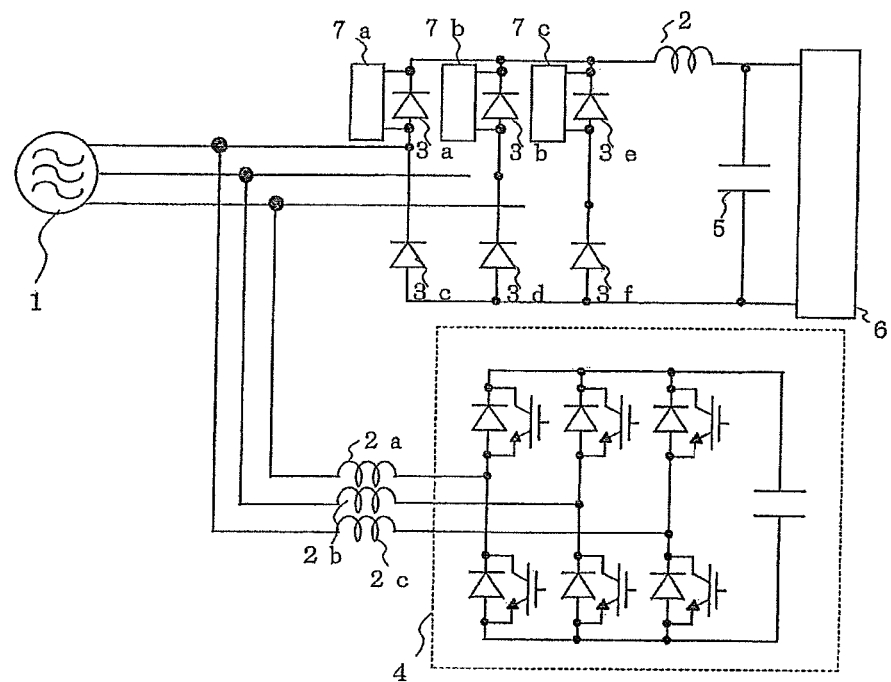
FIG. 36 illustrates another configuration example of the power converting device according to Embodiment 7.
Figure 37:
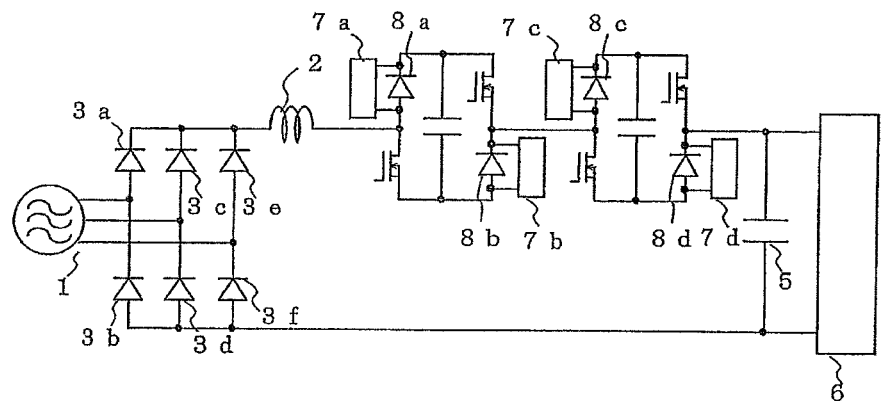
FIG. 37 illustrates another configuration example of the power converting device according to Embodiment 7.

FIG. 27 illustrates another configuration example of the power converting device according to Embodiment 6. As shown in FIG. 27, the power converting device may be formed by connecting commutating means 7a to 7d in parallel with backflow preventing elements 8a to 8d, respectively, on electric-current paths.

In the power converting device having the above-described circuit, the commutating means 7 is provided, as in Embodiment 1 or Embodiment 2, and commutation control of the commutating means 7 is performed in accordance with the operation of, for example, the short-circuiting means 4. Therefore, the recovery electric current can be reduced, whereby noise reduction and loss reduction can be advantageously achieved or size reduction of the circuit and suppression of a cost increase can be advantageously achieved, as in, for example, Embodiment 1 and Embodiment 2.

Embodiment 7

FIGS. 28 to 37 illustrate configuration examples of a power converting device according to Embodiment 7 of the present invention. In FIGS. 28 to 37, means, elements, and the like that perform operations similar to those in, for example, FIG. 1 are given the same reference numerals.

In each of Embodiment 1 to Embodiment 6 described above, the power converting device corresponds to a single-phase alternating-current power supply 1. For example, as shown in FIGS. 28 to 37, a power converting device of a similar type that corresponds to a three-phase alternating-current power supply may be provided with the commutating means 7 and perform commutation control. In the power converting device shown in each of FIGS. 28 to 37, a recovery electric current can be reduced, whereby noise reduction and loss reduction can be advantageously achieved or size reduction of the circuit and suppression of a cost increase can be advantageously achieved, as in, for example, Embodiment 1.

Embodiment 8

Figure 38:
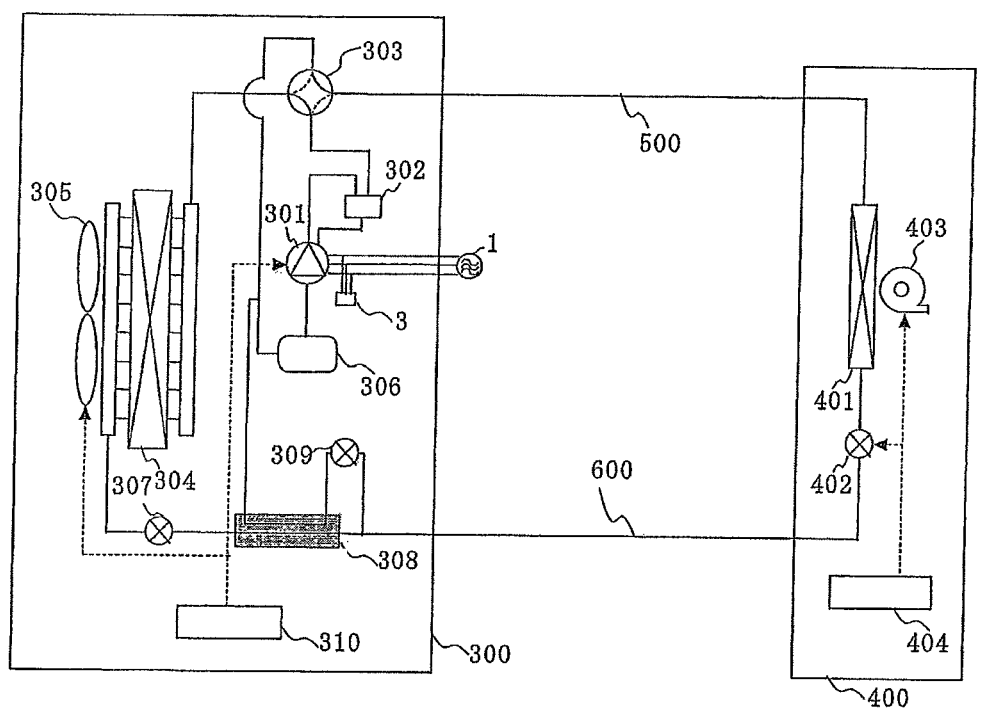
FIG. 38 is a configuration diagram of a refrigerating and air-conditioning apparatus according to Embodiment 8 of the present invention.

FIG. 38 is a configuration diagram of a refrigerating and air-conditioning apparatus according to Embodiment 8 of the present invention. In Embodiment 8, a refrigerating and air-conditioning apparatus that is supplied electric power via the aforementioned power converting device will be described.

The refrigerating and air-conditioning apparatus in FIG. 38 includes a heat-source-side unit (i.e., an outdoor unit) 300 and a load-side unit (i.e., an indoor unit) 400 that are connected by refrigerant pipes so that a main refrigerant circuit (referred to as "main refrigerant circuit" hereinafter) through which a refrigerant circulates is formed. The refrigerant pipes include a gas pipe 500 through which a refrigerant in a gas state (i.e., a gas refrigerant) flows and a liquid pipe 600 through which a refrigerant in a liquid state (i.e., a liquid refrigerant, or sometimes a two-phase gas-liquid refrigerant) flows.

In Embodiment 8, the heat-source-side unit 300 is constituted of devices (i.e., means) including a compressor 301, an oil separator 302, a four-way valve 303, a heat-source-side heat exchanger 304, a heat-source-side fan 305, an accumulator 306, a heat-source-side expansion device (i.e., an expansion valve) 307, an intermediate heat exchanger 308, a bypass expansion device 309, and a heat-source-side control device 310.

The compressor 301 suctions a refrigerant, compresses the refrigerant, and discharges the refrigerant. The compressor 301 is of a type whose operating frequency is arbitrarily changeable such that the capacity (i.e., an amount of refrigerant fed per unit time) of the compressor 301 is finely adjustable. The power converting device according to any one of Embodiment 1 to Embodiment 7 described above is attached between, for example, the alternating-current power supply 1, which supplies electric power for driving the compressor 301 (i.e., a motor), and the compressor 301 serving as the load 6.

The oil separator 302 is configured to separate a lubricant, which is mixed in the refrigerant and discharged from the compressor 301, from the refrigerant. The separated lubricant is returned to the compressor 301. The four-way valve 303 changes the flow of the refrigerant between a cooling operation mode and a heating operation mode on the basis of a command from the heat-source-side control device 310. The heat-source-side heat exchanger 304 exchanges heat between the refrigerant and air (i.e., outdoor air). For example, during heating operation, the heat-source-side heat exchanger 304 functions as an evaporator and exchanges heat between the air and a low-pressure refrigerant flowing thereto via the heat-source-side expansion device 307 so as to evaporate and gasify the refrigerant. During cooling operation, the heat-source-side heat exchanger 304 functions as a condenser and exchanges heat between the air and a refrigerant flowing thereto from the four-way valve 303 side and compressed by the compressor 301 so as to condense and liquefy the refrigerant. In order to efficiently exchange heat between the refrigerant and the air, the heat-source-side heat exchanger 304 is provided with the heat-source-side fan 305. With regard to the heat-source-side fan 305, the rotation speed of the fan may be finely adjusted by supplying electric power thereto via the power converting device according to each of Embodiment 1 to Embodiment 7 described above and, for example, arbitrarily changing the operating frequency of a fan motor in an inverter serving as the load 6.

The intermediate heat exchanger 308 exchanges heat between a refrigerant flowing through a main flow path of the refrigerant circuit and a refrigerant that has diverged from the aforementioned flow path and whose flow rate has been adjusted by the bypass expansion device 309 (i.e., an expansion valve). In particular, when the refrigerant needs to be supercooled during cooling operation, the intermediate heat exchanger 308 supercools the refrigerant and supplies the refrigerant to the load-side unit 400. The liquid flowing via the bypass expansion device 309 is returned to the accumulator 306 via a bypass pipe. The accumulator 306 is, for example, means for storing excess liquid refrigerant. The heat-source-side control device 310 is formed of, for example, a microcomputer. The heat-source-side control device 310 is capable of communicating with a load-side control device 404 in a wired or wireless manner. For example, based on data related to detection by various kinds of detecting means (i.e., sensors) within the refrigerating and air-conditioning apparatus, the heat-source-side control device 310 controls the overall operation of the refrigerating and air-conditioning apparatus by controlling each means related to the refrigerating and air-conditioning apparatus, such as by controlling the operating frequency of the compressor 301 by controlling an inverter circuit. Furthermore, the processing performed by the control means 102 described in each of Embodiment 1 to Embodiment 7 may be performed by the heat-source-side control device 310.

The load-side unit 400 includes a load-side heat exchanger 401, a load-side expansion device (i.e., an expansion valve) 402, a load-side fan 403, and the load-side control device 404. The load-side heat exchanger 401 exchanges heat between a refrigerant and air. For example, during heating operation, the load-side heat exchanger 401 functions as a condenser and exchanges between the air and a refrigerant flowing thereto from the gas pipe 500 so as to condense and liquefy the refrigerant (or to change the refrigerant into a two-phase gas-liquid state), and discharges the refrigerant toward the liquid pipe 600. During cooling operation, the load-side heat exchanger 401 functions as an evaporator and exchanges heat between the air and a refrigerant changed into a low-pressure state by the load-side expansion device 402 so as to evaporate and gasify the refrigerant by making the refrigerant receive heat from the air, and discharges the refrigerant toward the gas pipe 500. Furthermore, the load-side unit 400 is provided with the load-side fan 403 for adjusting the flow of air that is to exchange heat with the refrigerant. The operating speed of the load-side fan 403 is set by, for example, a user. The load-side expansion device 402 is provided for adjusting the pressure of the refrigerant within the load-side heat exchanger 401 by changing the opening degree of the load-side expansion device 402.

The load-side control device 404 is also formed of, for example, a microcomputer and is capable of communicating with, for example, the heat-source-side control device 310 in a wired or wireless manner. Based on a command from the heat-source-side control device 310 or a command from, for example, a resident, each device (i.e., means) in the load-side unit 400 is controlled such that, for example, the indoor temperature is set to a predetermined temperature. Furthermore, a signal that contains data related to detection by detecting means provided in the load-side unit 400 is transmitted.

Accordingly, in the refrigerating and air-conditioning apparatus according to Embodiment 8, electric power is supplied to, for example, the compressor 301 and the heat-source-side fan 305 by using the power converting device according to any one of Embodiment 1 to Embodiment 7 described above, whereby a highly-efficient, highly-reliable refrigerating and air-conditioning apparatus can be obtained.

Industrial Applicability

Although Embodiment 8 described above is directed to a case where the power converting device according to the present invention is applied to the refrigerating and air-conditioning apparatus, the present invention is not limited to the above. The power converting device according to the present invention may also be applied to, for example, a heat pump apparatus, an apparatus that utilizes a refrigeration cycle (i.e., a heat pump cycle), such as a refrigerator, a transport apparatus, such as an elevator, or an illuminator (system). In that case, similar advantages can be exhibited.

The invention claimed is:

1. Backflow preventing means comprising:
a backflow preventing element that is connected between a power supply and a load and that prevents an electric current from flowing backward from the load toward the power supply; and
commutating means for performing a commutation operation for causing the electric current of the same direction as a forward direction of the backflow preventing element to flow toward a different path that is connected in parallel with the backflow preventing element,
the commutating means includes
a commutation rectifying element that rectifies the electric current flowing through the different path, when the backflow preventing element is reverse-recovered,
a transformer that performs the commutation operation by applying voltage based on voltage related to a primary winding to a secondary winding on the different path, and
a transformer driving device that controls application of voltage to the primary winding of the transformer.

2. The backflow preventing means of claim 1,
wherein the transformer driving device
has a commutation power supply and a commutation switch and is connected to the primary winding of the transformer, and
controls an electric current flowing from the commutation power supply toward the primary winding of the transformer by opening and closing the commutation switch.

3. The backflow preventing means of claim 1, wherein
a plurality of the backflow preventing elements are connected in parallel with respective commutation rectifying elements and respective secondary windings of the transformer, and
the primary winding of the transformer is shared.

4. The backflow preventing means of claim 3,
wherein the secondary windings are reversely wound one another so that each commutation operation of the backflow preventing elements is performed at a different timing.

5. The backflow preventing means of claim 1, wherein a wide band-gap semiconductor is used as the commutation rectifying element.

6. The backflow preventing means of claim 5,
wherein the wide band-gap semiconductor is composed of silicon carbide, gallium nitride, or diamond.

7. A power converting device comprising:
a rectifying circuit that rectifies the electric current from an alternating-current power supply by using the backflow preventing means of claim 1 as at least one or all of rectifying elements;
a smoothing capacitor that smoothes output voltage from the rectifying circuit;
short-circuiting means that is disposed on a side of the alternating-current power supply rather than the smoothing capacitor and that short-circuits the alternating-current power supply by opening and closing a switch;
a reactor that is disposed on the side of the alternating-current power supply rather than the short-circuiting means; and
control means that performs commutation control of the backflow preventing means and controls opening and closing of the switch in the short-circuiting means.

8. A power converting device comprising:

a rectifying circuit that rectifies voltage of an alternating-current power supply;

a smoothing capacitor that smoothes output voltage from the rectifying circuit;

short-circuiting means that is disposed on a side of the alternating-current power supply rather than the smoothing capacitor and that short-circuits the alternating-current power supply by opening and closing a switch;

a reactor that is disposed on the side of the alternating-current power supply rather than the short-circuiting means;

the backflow preventing means of claim 1 that prevents an electric current from flowing backward from the smoothing capacitor; and control means that performs commutation control of the backflow preventing means and controls opening and closing of the switch in the short-circuiting means.

9. The power converting device of claim 7, wherein the control means causes the commutating means to start the commutation operation before the alternating-current power supply is short-circuited by closing the switch of the short-circuiting means.

10. The power converting device of claim 7, wherein the control means causes the commutating means to complete the commutation operation within a predetermined time including a timing at which the switch of the short-circuiting means is closed.

11. The power converting device of claim 7, wherein the commutating means performs the commutation operation in accordance with a voltage phase of the alternating-current power supply.

12. The power converting device of claim 7, wherein a power supply for driving the commutating means is a common power supply serving as at least one of a drive power supply for the short-circuiting means and a power supply that supplies voltage to the control means.

13. A refrigerating and air-conditioning apparatus comprising the power converting device of claim 7 for driving at least one of a compressor and an air-sending device.

14. The backflow preventing means of claim 2 wherein a plurality of the backflow preventing elements are connected in parallel with respective commutation rectifying elements and respective secondary windings of the transformer, and the primary winding of the transformer is shared.

15. The backflow preventing means of claim 14, wherein the secondary windings are reversely wound one another so that each commutation operation of the backflow preventing elements is performed at a different timing.

16. The backflow preventing means of claim 3, wherein a wide band-gap semiconductor is used as the commutation rectifying element.

17. The backflow preventing means of claim 4, wherein a wide band-gap semiconductor is used as the commutation rectifying element.

18. The backflow preventing means of claim 16, wherein the wide band-gap semiconductor is composed of silicon carbide, gallium nitride, or diamond.

19. The backflow preventing means of claim 17, wherein the wide band-gap semiconductor is composed of silicon carbide, gallium nitride, or diamond.

\* \* \* \* \*